United States Patent [19]
Horie et al.

[11] Patent Number: 5,581,539
[45] Date of Patent: Dec. 3, 1996

[54] OPTICAL RECORDING MEDIUM

[75] Inventors: Michikazu Horie; Haruo Kunitomo; Takashi Ohno; Kenichi Takada; Hironobu Mizuno, all of Yokohama, Japan

[73] Assignee: Mitsubishi Chemical Corporation, Tokyo, Japan

[21] Appl. No.: 513,588

[22] Filed: Aug. 10, 1995

[30]    Foreign Application Priority Data

Aug. 12, 1994  [JP]  Japan .................................... 6-190632
Sep. 22, 1994  [JP]  Japan .................................... 6-228351
Sep. 30, 1994  [JP]  Japan .................................... 6-237881
Mar. 23, 1995  [JP]  Japan .................................... 7-064136
Apr. 6, 1995   [JP]  Japan .................................... 7-081513

[51] Int. Cl.$^6$ ................................................. G11B 7/24
[52] U.S. Cl. ................... 369/275.4; 369/275.1
[58] Field of Search ..................... 369/275.4, 275.1, 369/275.3, 58, 44.26, 276, 277, 278, 279; 430/320, 321; 428/64.1, 64.2, 64.4

[56]              References Cited

U.S. PATENT DOCUMENTS

| 5,230,973 | 7/1993 | Yoshioka et al. | 369/116 |
| 5,383,176 | 1/1995 | Inui et al. | 369/275.4 |
| 5,407,720 | 4/1995 | Omaya | 369/275.4 |
| 5,493,552 | 2/1996 | Kobori | 369/275.4 |
| 5,493,561 | 2/1996 | Nishiuchi et al. | 369/275.4 |

FOREIGN PATENT DOCUMENTS

| 0564260A2 | 3/1993 | European Pat. Off. . |
| 0578015A1 | 6/1993 | European Pat. Off. . |
| 0574025A2 | 6/1993 | European Pat. Off. . |
| 0642123A1 | 3/1994 | European Pat. Off. . |
| 60-263352 | 12/1985 | Japan ................ 369/275.4 |
| 63-18535 | 1/1988 | Japan ................ 369/275.4 |
| 63-57859 | 11/1988 | Japan . |
| 528505 | 2/1993 | Japan . |
| 5-128589 | 5/1993 | Japan . |
| 5-282705 | 10/1993 | Japan . |
| 6-338064 | 12/1994 | Japan . |

OTHER PUBLICATIONS

Steinbrink, Bernd: *Optische Speichertechnik*, "Lichte Bits" c't 1995, H.2, S. 76–78, 80–81.
*Patent Abstracts of Japan*, vol. 17, No. 408, P–1582 (6037), JP–5,73954, May 1993.
*Patent Abstracts of Japan*, vol. 18, No. 184, P–1719 (6542), JP–5,342,635, May 1993.
*Japanese Journal of Applied Physics, High Speed Overwritable Phase Change Optical Disk Material*, vol. 26 (1987) Supplement 26–4, pp. 61–66.
*SPIE, High track density magneto–optical recording using a crosstalk canceler*, vol. 1316, Optical Data Storage (1990) pp. 35–39.

(List continued on next page.)

*Primary Examiner*—Tan Dinh
*Attorney, Agent, or Firm*—David G. Conlin; Brian L. Michaelis

[57]              ABSTRACT

The disclosure describes an optical recording medium for recording, erasing and reading-out information by irradiation a laser beam, comprising:

a lower dielectric protective layer, a phase-change-type recording layer, an upper dielectric protective layer and a metal reflective layer successively deposited on a transparent substrate formed with grooves, in which both of grooves and lands are used as a recorded region, a groove depth (d) satisfies the following relation (1):

$$\lambda/7n < d < \lambda/5n \qquad (1)$$

wherein $\lambda$ represents a wavelength of an irradiation light and n represents a refractive index of the substrate, and a groove width (GW) and a land width (LW) satisfy the following relation (2):

$$0.1 \ \mu m < GW < LW \qquad (2)$$

37 Claims, 8 Drawing Sheets

OTHER PUBLICATIONS

*Japanese Journal of Applied Physics, Land and Groove Recording for High Track Density on Phase–Change Optical Disks*, vol. 32 (1993) pp. 5324–5328.

*Japanese Journal of Applied Physics, Performance of a 600 Mbyte 90 mm Phase–Change Optical Disk against Disk Tilt*, vol. 32 (1993) pp. 5402–5405.

*SPIE, Effect of Track Crossing on Focus Servo Signals: Feedthrough*, vol. 1663, Optical Data Storage (1992) pp. 157–163.

*Applied Optics, Effect of disk birefringence on a differential magneto–optic readout*, (1992) vol. 31, No. 11, pp. 1353–1862.

*Applied Optics, Jones–matrix analysis of magnetooptical media and read–back systems*, (1987) vol. 26, No. 18, pp. 3974–3980.

OPTICAL RECORDING MEDIUM

BACKGROUND OF THE INVENTION

The present invention relates to an optical recording medium, and more in detail, it relates to an optical information recording medium for performing recording/reading-out and erasure of information in both of grooves and an inter-groove portions (lands) of a substrate by irradiation of a laser beam.

Along with increasing amount of information in recent years, a recording medium capable of recording and reading-out a great amount of data at a high density and at a high speed has been demanded, and an optical disk is expected as a medium just suitable to such an application use.

Optical discs include a write-once-type disk capable of recording only for once and a rewritable-type disk capable of recording and erasure over and over.

As the rewritable-type optical disk, there can be mentioned a magneto-optical recording medium utilizing an magneto-optical effect and a phase-change medium utilizing the change of reflectance along with reversible change between amorphous and crystal states.

The phase-change medium has a merit capable of recording/erasure by only modulating the power of a laser beam without requiring an external magnetic field, and capable of miniaturizing of a recording/reading-out device.

Further it has also a merit capable of obtaining a high density recording medium by a shorter wavelength with no particular alteration of materials from existent medium predominant at present capable of recording/erasure at a wavelength of about 800 nm.

As the material for the recording layer of such a phase-change medium, a thin film of chalcogenic alloy is often used. There can be mentioned, for example, GeTe-based materials, GeTeSb-based materials, InSbTe-based materials and GeSnTe-based materials.

Generally, in a rewritable phase-change recording medium, recording is performed by forming an amorphous bit from a crystallized state in a unrecorded/erased state. The amorphous bit is formed by heating the recording layer to a temperature higher than the melting point followed by quenching. In this case, a dielectric layer disposed in contact with the recording layer serves as a heatsink layer for obtaining a sufficiently overcooled state, and a protective layer for suppressing an ablation.

On the other hand, erasure (crystallization) is performed by heating the recording layer to a temperature higher than the crystallizing temperature and lower than the melting point of the recording layer.

In this case, the dielectric layer serves as a heat accumulating layer for keeping the temperature of the recording layer at a high temperature till crystallization is completed.

Generally in a writable phase-change recording medium, a laser beam of two different power levels is used for attaining different crystal states.

The recording film is selected from view points that the film can easily take a crystallized state or an amorphous state moderately, has a large difference of reflectance between the crystallized state and the amorphous state, and shows small volume change due to phase-change, or the like.

The material for the protective layer is selected from view points, for example, having optical transparency to a laser beam, appropriate refractive index, high melting point, softening point and decomposition point, ease of preparation and appropriate heat conductivity.

In a phase-change-type medium capable of 1-beam overwriting, the erasing and rewriting steps can be performed only by the intensity modulation of one focused beam (Jpn. J. Appl. Phis., 26 (1987), suppl. 26-4, pp. 61–66).

In the 1-beam overwritable phase-change recording medium, the time required for writing information can be shortened. It has a further merit that a drive can be constituted simply and inexpensively since the medium requires no magnetic fields.

Further a write-once-type phase-change medium can also be obtained by substantially the same material and layer constitution as those of the rewritable-type medium by changing the composition of the recording layer from that of the reversible phase-change type recording layer.

In this case, information can be recorded and stored for a longer period of time since the medium has no reversibility and the information can be stored, in principle, substantially permanently.

In a case of using the phase-change medium as the write-once-type medium, different from an ablation-type since no raising called as a rim is not caused to the periphery of a bit, it has a merit of providing excellent signal quality, and, since no gap is required above the recording layer, there is no requirement for an air sandwich structure.

The requirements of the high capacity and the high density in the recording medium is inevitable of the times, imposed on recording media and recording apparatus for handling an enormous amount of video information or audio signals, and they have been ever-progressing keeping pace with the progress of digital modulation technique and data compression technique. These high capacity and density are also demanded in the above-mentioned phase-change optical recording medium.

As a concrete means for increasing the recording density, in the optical disk, there have been developed and utilized, for example, reduction of a focused beam diameter of irradiated light and shortening of recording mark length by shortening the wavelength of the optical source or making NA (Numerical Aperture) of lens high, MCAV (Modified Constant Angular Velocity) of increasing recording frequency toward an outer circumference under constant rotational frequency, thereby making the recording density constant from inner to outer circumferences, and a mark edge recording of carrying information to beginning and rear ends of a mark, and means for further increasing the density has been thought at present.

Further in the phase-change-type medium, since there is less deterioration caused by the reduction of optical resolution and a signal amplitude can be increased even in a case of recording at an identical track pitch (track pitch density) and a shortest bit length (longitudinal recording density), it has a merit capable of easily attaining increased density as compared with the magneto-optical medium.

In an optical disk capable of recording, guide grooves are previous engraved on a disk to form so-called tracks. Usually, information signals are recorded, read out or erased by condensing a laser beam on a land or in a guide groove.

In an optical disk, lands and grooves are formed alternately in a radial direction coaxially or spirally and a focused light is guided by utilizing a diffracted light from the portions. The system includes a push-pull tracking-servo system of utilizing a radial difference of an intensity of a reflected light from an optical disk, namely, utilizing a diffracted light from a land or groove detecting 0th and 1st diffracted light by two splitted detectors, thereof (I1–I2 signal), and a 3-beam system using three splitted optical beams arranged in parallel in a radial direction and guiding a focused light by the calculation of the intensity of the reflected light for each of beams at three detector positions, that is, a land and grooves on both sides thereof or a groove and lands on both sides thereof. Further, the radial movement in such an optical disk is conducted by a system of counting the number of tracks passed by a cross track signal (I1+I2) and approaching an aimed track. In a usual optical disk, since recording/reading-out is performed only to the lands or only to the grooves, the width of the land (or groove) used for recording is made wider usually by about twice compared with that of the groove (or land) not used for recording. For further increasing the capacity, a system of recording/reading-out in both of the land and the groove is also considered. The capacity of the optical disk is doubled by recording both in the land and the groove.

In ordinary optical disks marketed at present, usually, information signals are recorded to either one of the land or the groove, and the other of them serves only as a boundary for separating adjacent tracks to prevent intrusion of leaked signals.

If information can be recorded also in the boundary portion, for example, in the groove in the case of recording information on the land, or on the land in a case of recording information in the groove, the recording density is doubled and remarkable improvement can be expected for the recording capacity.

A method of recording information to both of the land and the groove are hereinafter simply referred to as "L&G recording".

L&G recording is proposed, for example, in Japanese Patent Publication (KOKOKU) 63-57859 and a special care has to be taken for reducing cross-talk in a case of using such L&G recording technique.

That is in the L&G recording described in Japanese Patent Publication (KOKOKU) 63-57859, since the distance between a row of recording marks in a certain track and a row of recording marks in a track adjacent therewith is one-half of a focused beam diameter, the focused beam diameter lies over the row of recording marks adjacent with the row of recording marks to be read out. Therefore, cross talk upon reading-out is increased to deteriorate the reading-out S/N.

For reducing the cross talk, there is proposed a method as described for example, in SPIE Vol. 1316, Optical Data Storage (1990), pp 35, of disposing a special optical system and a cross talk cancel circuit to an optical disk reading-out device, thereby reducing the cross talk. However, this method involves a disadvantage of further complicating the optical system and the signal processing system of the device.

As a method of reducing the cross talk with no additional provision of special optical system or signal processing circuit for reducing the cross talk upon reading-out, it has been proposed to make the width of the groove (guide groove) equal with that of the land and define the groove depth within a certain range corresponding to a wavelength of a reading-out light (Jpn. J. Appl. Phys. Vol. 32 (1993), pp 5324 5328).

This proposal shows, by calculation and based on experiment that cross talk is reduced under the condition that the lane width is equal with the groove width and the groove depth is from $\lambda/7n$ to $\lambda/5n$ ($\lambda$: wavelength of reading-out light, n: refractive index of substrate).

This is disclosed also in Japanese Patent Application Laid-Open (KOKAI) 5-282705.

In the above-mentioned proposals, based on the premise that the groove width is equal with the land width, an effect of reducing the cross talk is shown by computer simulation, examples of actually manufacturing, evaluating disks are given, and their effectiveness is mentioned.

It has been reported that a high density 3 to 4 times the current density can be attained by L&G recording method using the phase-change medium in CD size (diameter: 120 nm) by combination with an optical head at 680 nm and 0.6 NA (numerical aperture of a condensing lens) available at present (Jpn. J. Appl. Phys., 32 (1993), pp 5324 5328). It is also said that high quality moving picture for not less than one hour can be recorded in combined use with image compression technique.

However as a result of the further present inventions' earnest study, it has been found that as the recording density is increased by restriction of a track pitch by narrowing the groove width while keeping the groove width-to-land width ratio at 1:1, characteristics are remarkably deteriorated on the lands in view of residue after erasure of a preceding mark or worsening jitter of the recording mark after repetitive overwriting, and on the other hand, that erasing characteristic or jitter is less worsened after repetitive recording overwriting in the groove even if the track pitch is narrowed.

Further according to the dependence of the CN ratio (carrier-to-noise ratio) and the cross talk on the groove depth described in the afore-mentioned report, although an effect of reducing the cross talk can be obtained by optimizing the groove depth, balance of the CN ratio is lost between the lands and the grooves.

In the L&G recording, it is not preferable in view of the signal quality of a disk that a difference is caused between the carrier level on the lands and the carrier level in the grooves, and as a result, the CN ratio for one of them is remarkably deteriorated. The difference thereof should be fallen within a specified range.

Since atoms can migrate in the phase-change optical disk upon recording and erasure, there is a problem of characteristic deterioration caused by repetitive recording and erasure.

Although the repetitive recording characteristic can be improved to some extent by optimizing, for example, the material for the recording layer and the protective layer, the layer constitution and conditions for preparing each of the layers, it is not yet sufficient. As the cause for the deterioration due to repetitive recording and erasure, there may be considered, for example, film deformation, material transfer in the recording film and segregation. It has not seen a reason why such phenomenon became conspicuous.

Also, there has been proposed for example, a sample servo method for guiding an optical beam by the arrangement of pits formed with unevenness without disposing the guide grooves, other than L & G recording.

Although a narrow track pitch can be achieved by the method, in a case of recording at a track pitch of not more than 1.0 μm, an extremely small spot diameter of the focused beam should be obtained by using an optical system at a short wavelength and with a great NA, but it has been known that the focal depth is also reduced in such an optical system.

Specifically, for the wavelength $\lambda$ and the lens numerical aperture NA, there are the following relationship.

Beam spot diameter$\propto \lambda/NA$

Focal depth$\propto \lambda/(NA)2$

The focal depth is abruptly reduced as the spot diameter at a focal point is restricted. Accordingly, if the focal point is automatically adjusted to the surface of the recording layer, a margin of a focus servo system is extremely narrowed. At the same time, the coma aberration caused by the tilt of the substrate increases.

One of the solutions is to reduce the thickness of the substrate to not more than 1.2 mm of the prior art (T. Sugaya, et al., Jpn. J. Appl. Phys. 32, 5402 (1993)).

Further if the track pitch is narrowed to 1.0 μm in the L&G recording, sample servo recording and land and groove recording, there is a problem that a slight deviation (offset) of the focus servo system as described above increases leak signal from adjacent tracks (cross talk).

It has become apparent recently that the focus offset is increased by astigmatism caused by vertical birefringence of a substrate (M. R. Latta, et al, Proceeding of SPIE, vol. 1663 (1992), pp 157).

That is since the focused beam has astigmatism, the focal position is separated into two points to provide a focal position in which a beam is restricted into an elongated shape along the direction of the track and a focal position in which the beam is restricted in an elongate shape in the direction perpendicular to the track.

Such astigmatism is particularly conspicuous in a case of using a linearly polarized beam.

It depends on the combination of individual drives or substance, to which of positions focusing is adjusted automatically. Further, it is not always adjusted to one of the focusing points but focusing may be conducted at an intermediate position.

If the beam at the focused position take such a position as it becomes elongate in a direction perpendicular to the track the cross talk from the adjacent track increases upon reading-out. Further, if such a beam shape is formed during recording, it may possibly erase an amorphous bit already recorded in the adjacent track.

This is because the temperature of the adjacent track is easily elevated by heating to a bottom portion of the focused beam if the track pitch is not more than 1.0 μm and smaller than the spot diameter of the focused beam.

It tends to occur easily that a portion of the amorphous bit is crystallized and erased during repetitive recording although such phenomenon is not caused by the recording only for once.

The problem around the birefringence of the substrate described above has been considered, as a problem, in a magneto-optical medium for detecting a minute Kerr rotation angle (W. A. Challener, et al., Applied Optics, Vol. 26, (1987), pp 3974, or I. Prikeryl, Applied Optics, vol. 31, (1992), pp 1853).

A phase difference caused by birefringence of the substrate presents a problem because of the physical property of the magneto-optical medium of detecting a minute ellipticity from a linearly polarized light and it has been considered that this scarcely causes a problem in the phase-change medium for detecting the intensity of the reflected light.

Therefore, only the in-plane birefringence, is noted for instance and it has been emphasized as a merit of the phase-change medium that it suffers from no effect of the noises or signal intensity even if the in-plane birefringence exceeds $20 \times 10^{-6}$.

Accordingly, it can be said that no appropriate countermeasure has substantially been taken in the phase-change medium.

However, the problem of the astigmatism exists, for example, in a case of using a linearly polarized beam of a semiconductor laser for ensuring compatibility with a magneto-optical medium, or in a case of saving circular polarization by using a λ/4 plate for simplifying the structure of an optical head and even the phase-change medium not detecting the polarized state tends to undergo the effect of the astigmatism by the presence of birefringence.

By the way, although the recording density can be increased more as the pitch of the groove or pit for tracking (track pitch) disposed on the substrate is smaller, there is a limit for narrowing the track pitch since there is a diffraction limit in the beam spot system.

Usually, the track pitch may be selected such that the amount of the cross talk is reduced to less than a predetermined level, but there is another problem to be considered in the phase-change medium.

This is a problem that the amorphous bit in the adjacent track is erased (recrystallized) upon repetitive overwriting to a certain track.

The reason is not always apparent but it is assumed that the temperature of the adjacent track is elevated by a weak laser beam at the bottom portion of an intensity distribution of the focused beam upon recording the adjacent track, so that the amorphous bit is heated to a temperature higher than the crystallization temperature.

While the heating time per once is within several hundreds nano seconds, it is recrystallized although gradually during repetitive heating.

For instance, the C/N ratio (carrier-to-noise ratio) of the adjacent track is reduced from 55 dB at the initial state to not more than 50 dB after 10,000 cycles of repetitive overwriting.

The problem is hereinafter is simply referred to as "cross erasure". In the phase-change medium, a care has to be taken to a minimum track pitch by cross erasure rather than the optical diffraction limit, but the limit is not always apparent.

In a case of performing L&G recording or sample servo recording, since no unevenness effective to shielding for heat conduction is present between the adjacent track, different from the recording only to one of the land or the groove of the prior art, the temperature of the adjacent track tends to be raised more easily by heat diffusion. Such cross erasure become a serious problem.

Accordingly, the substantial limit for the track density is restricted rather by the limit of thermal separation (cross erasure) than the optical resolution power, that is, signal leakage from the adjacent track (cross talk).

According to the study made by the present inventors, if L&G recording is conducted at a linear velocity of 3 m/s to a medium having grooves and lands each at 0.7 μm in width, by using a semiconductor laser at a wavelength of 680 nm and an optical head of 0.55 NA, the carrier level of signals recorded in the adjacent land or groove was lowered by 3 to 5 dB after 1,000 times of overwriting.

However in usual recording media, repetitive recording for more than 100 times is often conducted only in a case of rewriting the file management or allocation information on the recording medium. That is, only a limited region disposed to the inner circumference or the outer circumference of a disk referred to as FAT in the DOS format or TOC in the CD format is rewritten frequently.

The frequently rewriting region is less than 1% of the entire recordable region.

There may be such a case as in UNIX in which file management or allocation information is physically dispersed but it may suffice to consider an average number of writing and there is scarcely a possibility that a specified region is rewritten over 10,000 times.

It is considered that the situation will not change also in feature formats that recording is conducted while distinguishing the file management or allocation region and the contents thereof, and rewriting is concentrated only to a physically distinguished narrow region.

That is the recording density for the entire medium is restricted a present by less than 1% frequently rewritable region.

As a result of an earnest study of the present inventors, it has been found that an optical recording medium for recording, erasing and reading-out information by irradiation of a laser beam, comprising a lower dielectric protective layer, a phase-change-type recording layer, an upper dielectric protective layer and a metal reflective layer deposited orderly on a transparent substrate formed with grooves in which the grooves are formed on the transparent substrate such that the groove depth (d) can satisfy the following relation (1) and the groove width (GW) and land width (LW) can satisfy the following relation (2):

$$\lambda/7n < d < \lambda/5n \quad (1)$$

$$0.1 \ \mu m < GW < LW \quad (2)$$

in which both of the grooves and the lands are used for the recording region can reduce the cross talk from adjacent tracks and has excellent respective overwriting characteristics in the lands. On the basis of the findings the present invention have accomplished.

SUMMARY OF THE INVENTION

It is an object of the present invention to provide a high density optical disk with a high reliability, particularly, an L&G recording type optical disk using a laser beam as a light source, capable of keeping repetitive overwriting characteristic to a high level both for the lands and the grooves in a case if at least lands and grooves are used as the recording region.

Another object of the present invention is to provide a high density optical disk, particularly, an L&G recording type optical disk capable of eliminating loss of balance of the carrier levels of the recording marks between the lands and the grooves, and capable of obtaining equally high signal quality upon recording to either of the lands and the grooves.

To accomplish the aims, in a first aspect of the present invention, there is provided an optical recording medium for recording, erasing and reading-out information by irradiation of a laser beam, comprising:

a lower dielectric protective layer, a phase-change-type recording layer, an upper dielectric protective layer and a metal reflective layer successively deposited on a transparent substrate formed with grooves, in which both of grooves and lands are used as a recorded region, a groove depth (d) satisfies the following relation (1):

$$\lambda/7n < d < \lambda/5n \quad (1)$$

(wherein $\lambda$ represents a wavelength of an irradiation light and n represents a refractive index of the substrate), and a groove width (GW) and a land width (LW) satisfy the following relation (2):

$$0.1 \ \mu m < GW < LW \quad (2)$$

In a second aspect of the present invention, there is provided an optical recording medium for recording, erasing and reading-out information by irradiation of a laser beam, comprising:

a lower dielectric protective layer, a phase-change-type recording layer, an upper dielectric protective layer and a metal reflective layer successively deposited on a transparent substrate formed with grooves, in which both of grooves and lands are used as a recorded region, a groove depth (d) satisfies the following relation (1):

$$\lambda/7n < d < \lambda/5n \quad (1)$$

(wherein $\lambda$ represents a wavelength of an irradiation light and n represents a refractive index of the substrate), a groove width (GW) and a land width (LW) satisfy the following relation (2):

$$0.1 \ \mu m < GW < LW \quad (2)$$

and the land width (LW) satisfies the following relation (3):

$$0.62(\lambda/NA) < LW < 0.80(\lambda/NA) \quad (3)$$

(wherein NA represents a numerical aperture of a lens).

In a third aspect of the present invention, there is provided an optical recording medium for recording, erasing and reading-out information by irradiation of a laser beam, comprising:

a lower dielectric protective layer, a phase-change-type recording layer, an upper dielectric protective layer and a metal reflective layer successively deposited on a transparent substrate formed with grooves, in which both of grooves and lands are used as a recorded region, a groove depth (d) satisfies the following relation (1):

$$\lambda/7n < d < \lambda/5n \quad (1)$$

(wherein $\lambda$ represents a wavelength of an irradiation light and n represents a refractive index of the substrate), a groove width (GW) and a land width (LW) satisfy the following relation (2):

$$0.1 \ \mu m < GW < LW \quad (2)$$

the land width (LW) satisfies the following relation (3):

$$0.62(\lambda/NA) < LW < 0.80(\lambda/NA) \quad (3)$$

(wherein NA represents a numerical aperture of a lens), a phase difference ($\alpha$) between a reflected light from an unrecorded region and a reflected light from a recorded region of an optical recording medium satisfies the following relation (4):

$$-\pi < \alpha < 0 \quad (4)$$

and a reflectance ($R_1$) of an unrecorded region and a reflectance ($R_2$) of a recorded region satisfy the following relation (5):

$$R_2 < R_1 \quad (5)$$

In a fourth aspect of the present invention, there is provided an optical recording medium for recording, erasing and reading-out information by irradiation of a laser beam, comprising:

a lower dielectric protective layer, a phase-change-type recording layer, an upper dielectric protective layer and a metal reflective layer successively deposited on a transparent substrate formed with grooves,
in which
both of grooves and lands are used as a recorded region,
a groove depth (d) satisfies the following relation (1):

$$\lambda/7n < d < \lambda/5n \quad (1)$$

(wherein $\lambda$ represents a wavelength of an irradiation light and n represents a refractive index of the substrate),
a groove width (GW) and a land width (LW) satisfy the following relation (2):

$$0.1\ \mu m < GW < LW \quad (2)$$

the land width (LW) satisfies the following relation (3):

$$0.62(\lambda/NA) < LW < 0.80(\lambda/NA) \quad (3)$$

(wherein NA represents a numerical aperture of a lens),
a phase difference ($\alpha$) between a reflected light from an unrecorded region and a reflected light from a recorded region of an optical recording medium satisfies the following relation (6):

$$0 < \alpha < \pi \quad (6)$$

and
a reflectance ($R_1$) of an unrecorded region and a reflectance ($R_2$) of a recorded region satisfy the following relation (7):

$$R_2 > R_1 \quad (7).$$

In a fifth aspect of the present invention, there is provided an optical recording medium for recording, erasing and reading-out information by irradiation of a laser beam, comprising:
a lower dielectric protective layer, a phase-change-type recording layer, an upper dielectric protective layer and a metal reflective layer successively deposited on a transparent substrate formed with grooves,
in which
both of grooves and lands are used as a recorded region,
a groove depth (d) satisfies the following relation (1):

$$\lambda/7n < d < \lambda/5n \quad (1)$$

(wherein $\lambda$ represents a wavelength of an irradiation light and n represents a refractive index of the substrate),
a groove width (GW) and a land width (LW) satisfy the following relation (2):

$$0.1\ \mu m < GW < LW \quad (2)$$

and
the land width (LW) satisfies the following relation (3):

$$0.62(\lambda/NA) < LW < 0.80(\lambda/NA) \quad (3)$$

(wherein NA represents a numerical aperture of a lens), and
the land width (LW), the groove width (GW) and a distance between adjacent grooves (groove pitch (PG)=LW+ GW) satisfy the following relation (8):

$$0.02 < (LW - GW)/PG \leq 0.3 \quad (8)$$

In a sixth aspect of the present invention, there is provided an optical recording medium for recording, erasing and reading-out information by irradiation of a laser beam, comprising:
a lower dielectric protective layer, a phase-change-type recording layer, an upper dielectric protective layer and a metal reflective layer successively deposited on a transparent substrate formed with grooves,
in which
both of grooves and lands are used as a recorded region,
a groove depth (d) satisfies the following relation (1):

$$\lambda/7n < d < \lambda/5n \quad (1)$$

(wherein $\lambda$ represents a wavelength of an irradiation light and n represents a refractive index of the substrate),
a groove width (GW) and a land width (LW) satisfy the following relation (2):

$$0.1\ \mu m < GW < LW \quad (2)$$

and
the land width (LW) satisfies the following relation (3):

$$0.62(\lambda/NA) < LW < 0.80(\lambda/NA) \quad (3)$$

(wherein NA represents a numerical aperture of a lens),
the groove depth is from 40 to 80 nm, and
the groove width (GW) satisfies the following relation (9):

$$0.15(\lambda/NA) < GW < 0.35(\lambda/NA) \quad (9)$$

In a seventh aspect of the present invention, there is provided an optical recording medium for recording, erasing and reading-out information by irradiation of a laser beam, comprising:
a lower dielectric protective layer, a phase-change-type recording layer, an upper dielectric protective layer and a metal reflective layer successively deposited on a transparent substrate formed with grooves,
in which
both of grooves and lands are used as a recorded region,
a groove depth (d) satisfies the following relation (1):

$$\lambda/7n < d < \lambda/5n \quad (1)$$

(wherein $\lambda$ represents a wavelength of an irradiation light and n represents a refractive index of the substrate), and
a groove width (GW) and a land width (LW) satisfy the following relation (2):

$$0.1\ \mu m < GW < LW \quad (2)$$

the phase difference ($\alpha$) between a reflected light from an unrecorded region and a reflected light from a recorded region of the optical recording medium satisfies the following relation (4):

$$-\pi < \alpha < 0 \quad (4)$$

and
a reflectance ($R_1$) of the unrecorded region and reflectance ($R_2$) of the recorded region satisfy the following relation (5):

$$R_2 < R_1 \quad (5).$$

In an eighth aspect of the present invention, there is provided an optical recording medium for recording, erasing and reading-out information by irradiation of a laser beam, comprising:
a lower dielectric protective layer, a phase-change-type recording layer, an upper dielectric protective layer and a metal reflective layer successively deposited on a transparent substrate formed with grooves, in which
both of grooves and lands are used as a recorded region,
a groove depth (d) satisfies the following relation (1):

$$\lambda/7n < d < \lambda/5n \qquad (1)$$

(wherein $\lambda$ represents a wavelength of an irradiation light and n represents a refractive index of the substrate), and
a groove width (GW) and a land width (LW) satisfy the following relation (2):

$$0.1 \ \mu m < GW < LW \qquad (2)$$

the phase difference ($\alpha$) between a reflected light from an unrecorded region and a reflected light from a recorded region of the optical recording medium satisfies the following relation (6):

$$0 < \alpha < \pi \qquad (6)$$

and
a reflectance ($R_1$) of an unrecorded region and a reflectance ($R_2$) of a recorded region satisfy the following relation (7):

$$R_2 > R_1 \qquad (7)$$

In a ninth aspect of the present invention, there is provided an optical recording medium for recording, erasing and reading-out information by irradiation of a laser beam, comprising:
a lower dielectric protective layer, a phase-change-type recording layer, an upper dielectric protective layer and a metal reflective layer successively deposited on a transparent substrate formed with grooves,
in which
both of grooves and lands are used as a recorded region,
a groove depth (d) satisfies the following relation (1):

$$\lambda/7n < d < \lambda/5n \qquad (1)$$

(wherein $\lambda$ represents a wavelength of an irradiation light and n represents a refractive index of the substrate), and
a groove width (GW) and a land width (LW) satisfy the following relation (2):

$$0.1 \ \mu m < GW < LW \qquad (2)$$

and
the land width (LW), the groove width (GW) and a groove pitch (PG) satisfy the following relation (8):

$$0.02 \leq (LW-GW)/PG \leq 0.3 \qquad (8).$$

In a tenth aspect of the present invention, there is provided an optical recording medium for recording, erasing and reading-out information by irradiation of a laser beam, comprising:
a lower dielectric protective layer, a phase-change-type recording layer, an upper dielectric protective layer and a metal reflective layer successively deposited on a transparent substrate formed with grooves,
in which
both of grooves and lands are used as a recorded region,
a groove depth (d) satisfies the following relation (1):

$$\lambda/7n < d < \lambda/5n \qquad (1)$$

(wherein $\lambda$ represents a wavelength of an irradiation light and n represents a refractive index of the substrate), and
a groove width (GW) and a land width (LW) satisfy the following relation (2):

$$0.1 \ \mu m < GW < LW \qquad (2)$$

the melting point of the recording layer is less than 700° C., and
the crystallizing temperature of the recording layer is not less than 150° C.

In an eleventh aspect of the present invention, there is provided an optical recording medium for recording, erasing and reading-out information by irradiation of a laser beam, comprising:
a lower dielectric protective layer, a phase-change-type recording layer, an upper dielectric protective layer and a metal reflective layer successively deposited on a transparent substrate formed with grooves,
in which
both of grooves and lands are used as a recorded region,
a groove depth (d) satisfies the following relation (1):

$$\lambda/7n < d < \lambda/5n \qquad (1)$$

(wherein $\lambda$ represents a wavelength of an irradiation light and n represents a refractive index of the substrate),
a groove width (GW) and a land width (LW) satisfy the following relation (2):

$$0.1 \ \mu m < GW < LW \qquad (2)$$

and
the groove depth is from 40 to 80 nm and the groove width (GW) satisfies the following relation (9):

$$0.15(\lambda/NA) < GW < 0.5(\lambda/NA) \qquad (9)$$

In an twelfth aspect of the present invention, there is provided an optical recording medium for recording, erasing and reading-out information by irradiation of a laser beam, comprising:
a lower dielectric protective layer, a phase-change-type recording layer, an upper dielectric protective layer and a metal reflective layer successively deposited on a transparent substrate formed with grooves,
in which
both of grooves and lands are used as a recorded region,
a groove depth (d) satisfies the following relation (1):

$$\lambda/7n < d < \lambda/5n \qquad (1)$$

(wherein $\lambda$ represents a wavelength of an irradiation light and n represents a refractive index of the substrate),
a groove width (GW) and a land width (LW) satisfy the following relation (2):

$$0.1 \ \mu m < GW < LW \qquad (2)$$

and
a track pitch of a region to which a file management or allocation information is recorded is greater by 1.05 to 1.5 times than a track pitch of other data recorded regions.

In an thirteenth aspect of the present invention, there is provided an optical recording medium for recording, erasing and reading-out information by irradiation of a laser beam, comprising:
a lower dielectric protective layer, a phase-change-type recording layer, an upper dielectric protective layer and a metal reflective layer successively deposited on a transparent substrate formed with grooves,
in which
both of grooves and lands are used as a recorded region,
a groove depth (d) satisfies the following relation (1):

$$\lambda/7n < d < \lambda/5n \qquad (1)$$

(wherein λ represents a wavelength of an irradiation light and n represents a refractive index of the substrate), a groove width (GW) and a land width (LW) satisfy the following relation (2):

$$0.1 \ \mu m < GW < LW \qquad (2)$$

a track pitch of a region to which a file management or allocation information is recorded is greater by 1.05 to 1.5 times than a track pitch of other data recorded regions, and the groove width (GW) and the land width (LW) in the file management or allocation region satisfy the following relation (10):

$$0.6(\lambda/NA) < (GW+LW)/2 < 1.0 \ \mu m \qquad (10)$$

In an fourteenth aspect of the present invention, there is provided an optical recording medium for recording, erasing and reading-out information by irradiation of a laser beam, comprising:

a lower dielectric protective layer, a phase-change-type recording layer, an upper dielectric protective layer and a metal reflective layer successively deposited on a transparent substrate formed with grooves, in which both of grooves and lands are used as a recorded region, a groove depth (d) satisfies the following relation (1):

$$\lambda/7n < d < \lambda/5n \qquad (1)$$

(wherein λ represents a wavelength of an irradiation light and n represents a refractive index of the substrate), a groove width (GW) and a land width (LW) satisfy the following relation (2):

$$0.1 \ \mu m < GW < LW \qquad (2)$$

and the groove width (GW) and the land width (LW) satisfy the following relation (10):

$$0.6(\lambda/NA) < (GW+LW)/2 < 1.0 \ \mu m \qquad (10)$$

In a fifteenth aspect of the present invention, there is provided in optical recording medium comprising a lower dielectric protective layer, a phase-change-type recording layer, an upper dielectric protective layer and a metal reflective layer deposited successively on a transparent substrate formed with grooves for reversibly recording, erasing and reading-out information by utilizing an optically distinguishable crystallized or amorphous state, in which a track pitch of a region to which a file management or allocation information is recorded is greater by 1.05 to 1.5 times than a track pitch of other data recorded regions.

In a sixteenth aspect of the present invention, there is provided an optical recording medium comprising a lower dielectric protective layer, a phase-change-type recording layer, an upper dielectric protective layer and a metal reflective layer deposited successively on a transparent substrate formed with grooves for reversibly recording, erasing and reading-out information by utilizing an optically distinguishable crystallized or amorphous state, in which a track pitch of a region to which a file management or allocation information is recorded is greater by 1.05 to 1.5 times than a track pitch of other data recorded regions, and a groove width (GW) and a land width (LW) in the file management allocation region satisfy the following relation (10):

$$0.6(\lambda/NA) < (GW+LW)/2 < 1.0 \ \mu m \qquad (10)$$

DETAILED DESCRIPTION OF THE INVENTION

The substrate for the recording medium in the present invention may be any of glass, plastic (for example, polycarbonate, polyolefin) or glass forming a known photosetting resin film.

For forming fine guide grooves on the substrate, a convex shape on a Ni stamper is transferred to the substrate by injection molding.

The convex shape on the stamper is formed by cutting a photoresist by a laser beam. The fine grooves can be formed usually by using an Ar laser at a wavelength of 468 nm as a laser beam source for cutting. Further, fine grooves are formed by disposing a mask to an opening of a laser beam focusing lens, or using, for example, a He-Cd laser (wavelength: 441 nm) or Kr laser (wavelength: 407 nm).

In a case of a substrate having a wide groove width used so far met is sometimes necessary to oscillate a cutting laser beam, but this is not necessary for forming the guide grooves in the present invention, and accordingly, the cutting is facilitated.

Figure 1:
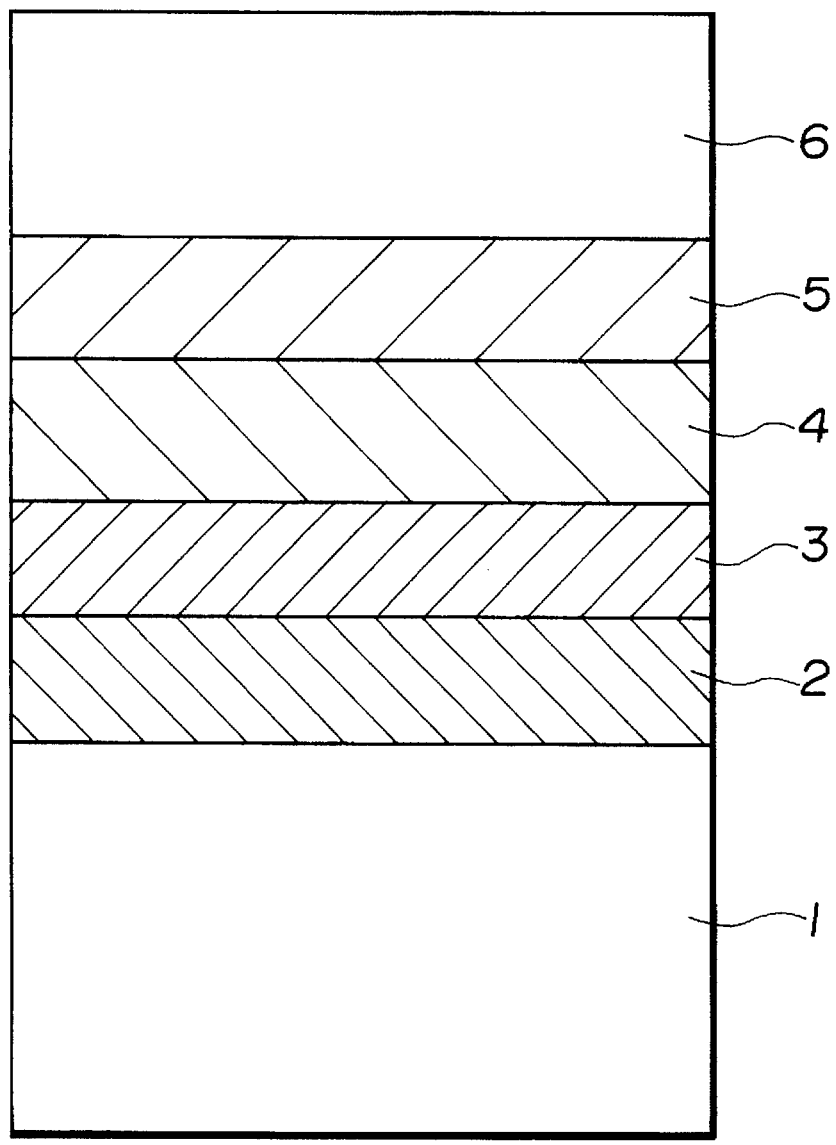
FIG. 1 is a cross sectional view illustrating a multi-layer structure of the optical disk.

The multilayer structure of the phase-change medium of the present invention is shown in FIG. 1.

It is necessary to provide a protective layers (2,4) for protecting the substrate (1) and the recording layer (3). If a protective layers (2,4) used have excellent heat resistance, provides an effect of preventing thermal deformation of the substrate and has good adhesion with the substrate, it is possible to use a polycarbonate resin substrate which is generally used at present as an optical disk substrate.

The protective layer in the prevent invention are preferably a dielectric protective layer composed of a dielectric material.

Various combinations are possible for dielectric materials used in the present invention and they are determined, for example, in view of refractive index, heat conductivity, chemical stability, mechanical strength, and adhesion.

Generally, oxides, sulfides, nitrides and carbides, for example, of Ca, Sr, Y, La, Ce, Ho, Er, Yb, Ti, Zr, Hf, V, Nb, Ta, Zn, Al, Si, Ge and Pb, and fluorides of Ca, Mg and Li, as well s compounds in which a portion of oxygen constituting metal oxides is substituted with S or Se can be used.

Favorable repetitive overwriting characteristics and stability with the passage of time can be obtained by using a film composed of a mixture containing at least one of ZnS and ZnSe, at least one of the compounds described above.

In this case, if the content of the metal compound is from 3 to 60 mol %, preferably, from 5 to 40 mol %, the preserving stability of the recorded disk is particularly excellent. As the metal compound, $SiO_2$ and $Y_2O_3$ may be exemplified.

The thickness of the protective layer is preferably within a range from 10 to 500 nm.

Generally, if the thickness of the protective layer is less than 10 nm, the effect of preventing the deformation of the substrate or the recording film may be insufficient. On the other hand, in a case of using a plastic substrate, if the thickness of the layer exceeds 500 nm, internal stresses in the protective layer itself or a difference of the elastic property between the layer and the substrate may become to generate cracks.

In the present invention, for improving the recording sensitivity, the thickness of the protective layer between the recording layer and the reflective layer is preferably not less than 100 nm and not more than 500 nm.

On the other hand, however, it is preferable that the thickness is from 10 to 30 nm for extending the recording power margin to reduce damage in repetitive overwriting even at the sacrifice of the recording sensitivity to some extent. This can rapidly dissipate the heat of the recording layer to the upper reflective layer, which can facilitate the formation of an amorphous mark and reduce the damage due to heat accumulation.

As the phase-change optical recording layer, GeSbTe-based materials, InSbTe-based materials, GeSnTe-based materials, AgInSbTe-based materials, etc. is used, and for the improvement of crystallizing rate, easy attainment of amorphous state, crystal grain size and preserving stability, Sn, In, Ge, Pb, As, Se, Si, Bi, Au, Ti, Cu, Ag, Pt, Pd, Co, Ni, V, Nb, Ta, etc. may be added.

The thickness is selected generally within a range from 10 nm to 100 nm, preferably, from 10 nm to 50 nm, more preferably, from 15 nm to 25 nm. If the thickness of the recording layer is less than 10 nm, no sufficient optical contrast may be obtained, or if obtained, it may be of no practical use because of great thickness dependence. In view of the curability thereof in the repetitive overwriting, the thickness of the GeSbTb-based recording layer is especially preferably 15 to 25 nm.

On the other hand, if the thickness exceeds 100 nm, cracks may tend to be developed.

The recording layer (3) is disposed being sandwiched by protective layers (2,4) on the substrate (1) and, further, a reflective layer (5) and, if necessary, a UV curable resin layer (protective film (6)) or the like are disposed on the recording layer.

As the reflective film, a metal material mainly composed of Al, Au or Ag, or metal materials incorporated, for example, with Ta, Ti, Cr, Si, Mg, Mn and Sc can be used.

Particularly, in view of the recording sensitivity and the stability, it is preferably an alloy of Al and Ti, or Al and Ta.

The content of Ti or Ta is preferably from 0.5 at % to 3.5 at %, by which the loss of reflectance of the disk is reduced and it serves as a moderate heatsink layer.

The recording layer, the protective layer and the reflective layer are formed, for example, by sputtering. Formation of films is preferably conducted by an inline apparatus in which a target for the recording layer, a target for the protective layer, and if necessary, a target for the reflective layer material are disposed in one identical vacuum chamber, in order to prevent oxidation or contamination between each of the layers. This is also excellent in view of productivity.

A protective film (6) composed of the same material as the protective layer (2, 4) may sometimes be disposed to a thickness from 10 nm to 500 nm on the reflective film (5) for improving the scratch resistance and humidity resistance. As the protective film (6), it is also effective to provide a thermo-curable or UV-curable resin to a thickness of about 0.5 to 100 μm by spin coating.

For recording, erasure and reading-out of the optical disk according to the present invention, a laser beam focused by an objective lens is used and irradiated from the side of a substrate of a rotating optical disk.

Upon recording and erasure, a pulse-modulated laser beam is irradiated on a rotating disk to cause phase-change of the recording layer into two reversible states, that is, a crystallized state or an amorphous state to attain an erased state or recording state (unrecorded state).

In this instance, a mark present, before recording can be erased at the same time with recording by overwriting.

Figure 2:
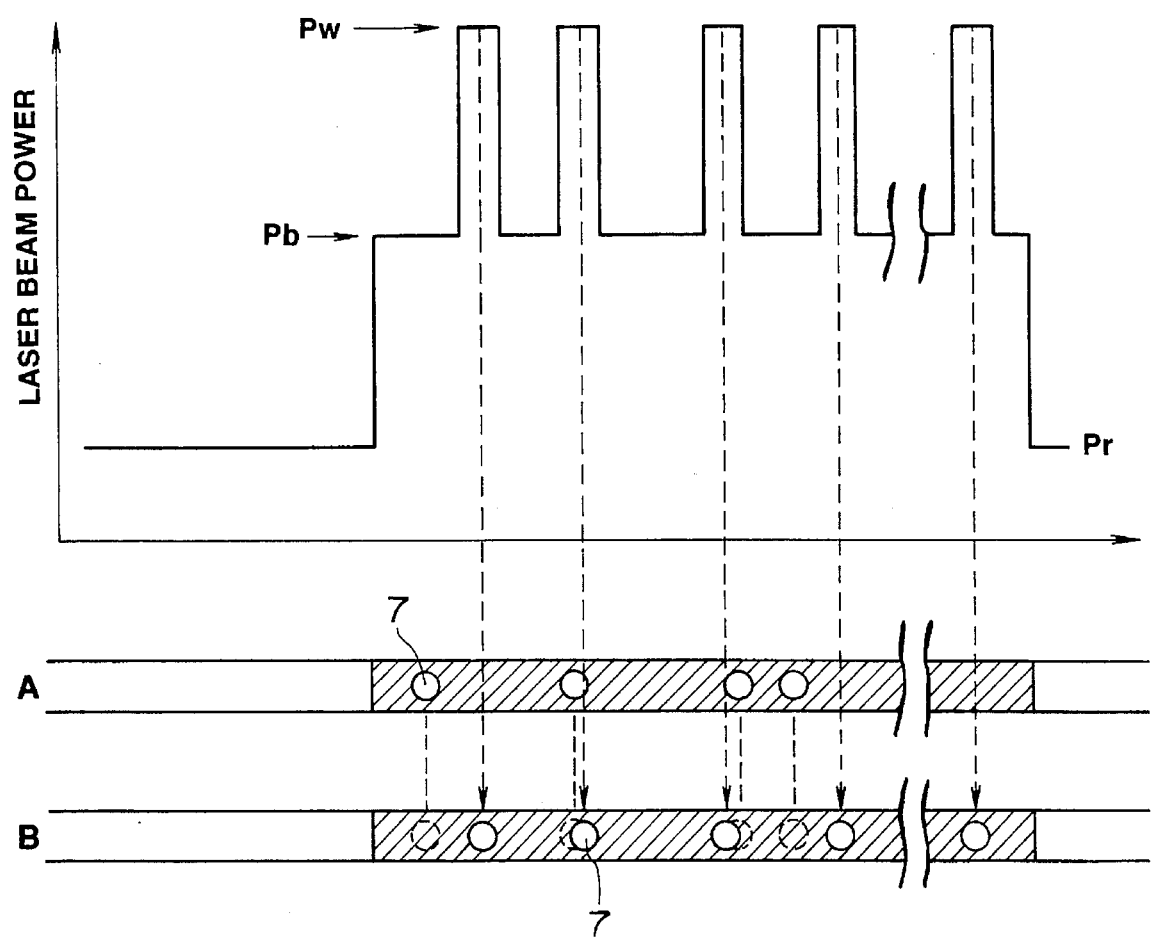
FIG. 2 is an explanatory view of an example of an overwriting method to a phase-change medium.

As shown in FIG. 2, overwriting to the phase-change medium described above is conducted by modulating a focused laser beam. For instance, the GeSbTe-based or AgInSbTe-based phase-change medium is in a crystallized state in the initial stage and the erased state and the recording pit is amorphous. In FIG. 2, a portion in a crystallized state (erased state) before overwriting (A) is transformed into an amorphous pit (7) under the irradiation of a laser beam power after overwriting (B), and the amorphous pit (7) before overwriting (A) is transformed into the erased state after overwriting (B).

The recording layer is melted by the recording power (Pw) to at least temperature higher than the melting point, to form an amorphous mark, and the temperature of the recording layer is elevated by the bias power (Pb) to a temperature not higher than the melting point to recrystallized into the erased state.

In the InSbTe-based materials, the erasing power (Pb) is made lower than (Pw) and the melting erasure of raising the temperature of the recording layer to not lower than the melting point is also conducted.

Upon reading-out, a laser beam at a power lower than a laser power upon recording and erasure is irradiated on the rotating disk. In this case, the phase state of the recording layer just before reading-out should not be changed.

The reading-out is conducted by detecting the intensity change of the reflected light by a photodetector to judge a recorded state or a unrecorded state.

In the optical disk according to the present invention, if overwriting are repeated for a number of times either to lands or grooves, remarkable reduction of the erasing ratio can be prevented to obtain reading-out signals at high quality with less jitter for recording marks both for the lands and the grooves.

By defining the groove width narrower than the land width by utilizing the merit that the margin is wide if the groove width is narrowed and if the land width is enlarged in view of the repetitive overwriting characteristic, recording density can be equal with or higher than the existent L&G recording optical disk having identical land width and groove in which the track pitch is reduced to a same extent.

Figure 3:
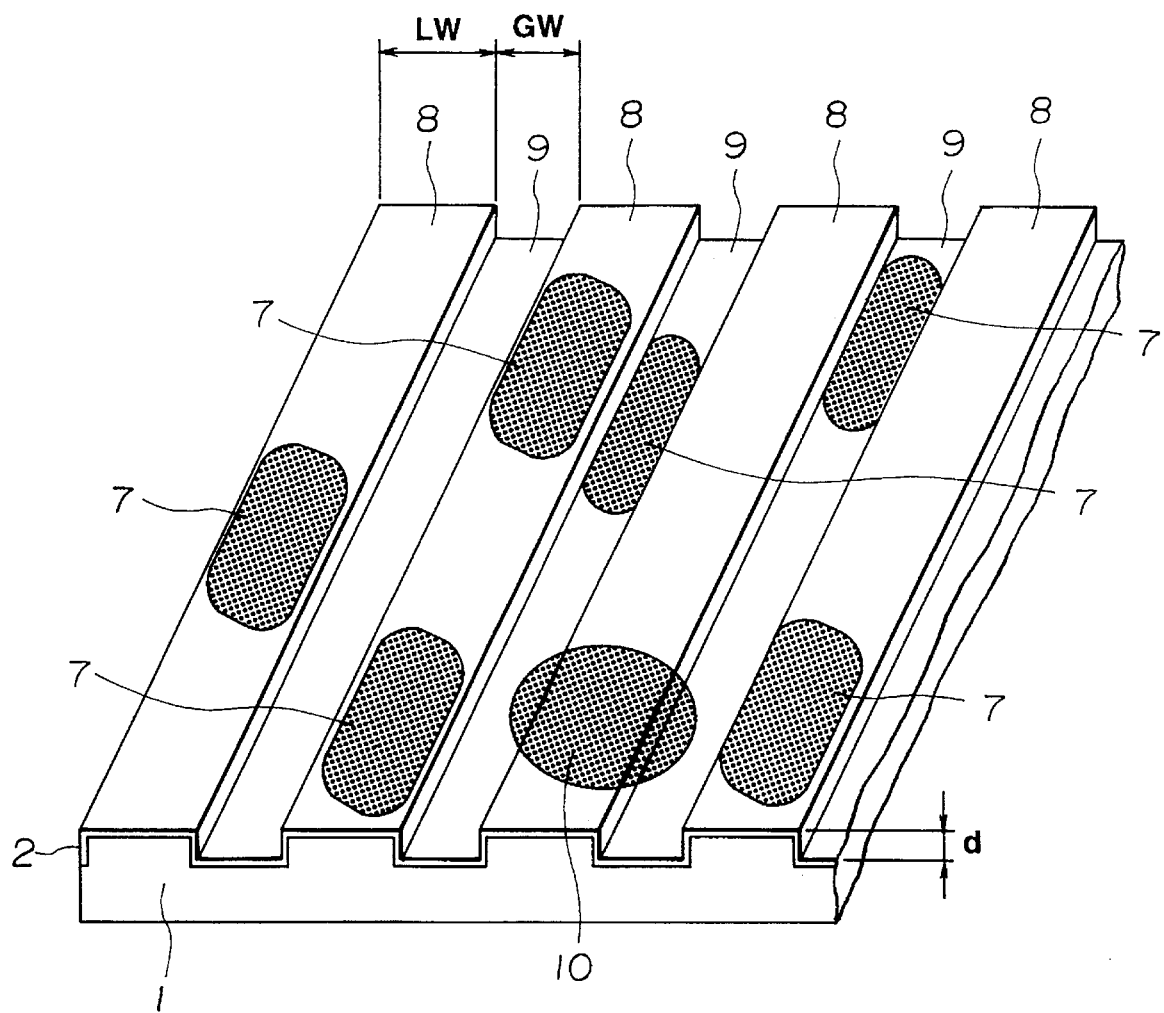
FIG. 3 is an enlarged perspective view schematically showing an optical disk of the present invention.

FIG. 3 is an enlarged perspective view schematically illustrating a portion of an optical disk according to the present invention. A land (8) and a groove portion (9) are previously formed on a disk substrate, in which the width for each of the land and groove is illustrated in an enlarged scale, and the width of the land (LW) is made wider as compared with the width of the groove (GW) within a range.

A recording layer (2) in the multilayer structure as shown in FIG. 1 is protected by a dielectric layer or the like, but layers other than the recording layer (2) are omitted for easy understanding of the drawing.

FIG. 3 shows an example in which a reading-out optical beam is irradiated to a unrecording region on the land (8) of an L&G optical disk.

A laser beam (10) focused by using an objective lens or the like is irradiated from the side of the substrate (1) to the disk for performing recording, erasure and reading-out.

Since the focused beam (10) is irradiated from the side of the substrate, it enters from the opposite side of the drawing sheet and is reflected. Accordingly, the land portion (8) is concave, whereas the groove portion (9) is convex as viewed from the optical source.

A difference in level (d) between the land (8) and the groove (9) may be of any value so long as it is within a range from $\lambda/7n$ to $\lambda/5n$, in which $\lambda$ is a wavelength of the focused beam (10) and n is a refractive index of the substrate (1).

This is because cross talk from an adjacent track is reduced when the groove depth is from $\lambda/7n$ to $\lambda/5n$ ($\lambda$: wavelength of reading-out light, n: refractive index of substrate) as described in Jpn. J. Appl. Phys. Vol. 32 (1993), pp 5324–5328. This report is based on the assumption of: (land width)=(groove width), and does not suggest the present invention. However, it is effective also to the present invention to define the groove depth as $\lambda/5n$ to $\lambda/7n$. When the present inventors carried out similar calculations as those in the above report for the geometries: GW<LW in the present invention, the cross talk takes its best values for $\lambda/7n<d<\lambda/5n$, especially for $\lambda/7n<d<\lambda/6n$ for the asymmetric L & L geometries.

In the present invention, the land width is defined as within a range from $0.62(\lambda/NA)$ to $0.80(\lambda/NA)$, in which $\lambda$ represents the wavelength of the irradiated beam and NA is a numerical aperture of an objective lens.

If the land width is narrower than the above-mentioned range, a preceding mark may remain conspicuously not being erased, in a case of repetitively overwriting a recording mark on the land, to worsen the jitter of the recording mark. This causes no problem in the write-once type phase change medium, but brings about a problem in the rewritable-type disk.

If the land width is within the above-mentioned range, there may be no erasing residue of the preceding mark or remarkable worsening of the jitter of the recording mark in a case of repetitive overwriting, and a characteristic equal with that recorded to the groove can be maintained.

If the and width is greater than the above-mentioned range, there may be no particular problem for the repetitive overwriting characteristic of the land and satisfactory characteristic can be obtained. However, unnecessary widening of the land width, which reduces the recording density, is not advantageous with a view point of high density recording.

A method of measuring the groove width and the groove depth is to be described. The measurement is conducted by irradiating a He-Ne laser beam (wavelength: 633 nm) from the side of the substrate not provided with grooves, and measuring the transmission light with respect to zero order light intensity (I0), primary light intensity (I1), and secondary light intensity (I2) diffracted by the grooves of the substrate and the angle of the diffraction light.

Assuming a groove pitch as (P), a groove width as (w), a groove depth as (d), a laser wavelength as $\lambda$ and an angle between the 0 order reflected light and the 1st diffracted lights as $\theta$, the groove width and the groove depth can be calculated since the following relationships are established in a case of rectangular grooves:

$$I2/I1=\cos^2(\pi\epsilon)$$

$$I1/I0=\{2\sin^2(\pi\epsilon)(1-\cos\delta)\}/[\pi^2\{1-2\epsilon(1-\epsilon)(1-\cos\delta)\}]$$

$\epsilon=w/P, \delta=2(n-1)\pi d/\lambda$ (n: refractive index of substrate)

$P=\lambda/\sin\theta$

Although the actual shape of the groove is not completely rectangular, values determined unimeaningly for the groove width and the groove depth by the above-mentioned measuring method are used for the groove shape in the present invention.

Accordingly, it is also applicable in a case where the groove shape is deviated from a completely rectangular shape in the present invention.

Further, it is reliable to outline the size of the groove shape by previously performing observation for the surface and cross section of the substrate disk, for example, by using SEM, STM (AFM) and then determining the shape, while referring thereto, by accurately determining the groove width and the groove depth by applying the measurement and calculation described above. In addition, when the groove pitch is smaller than the twice of $\lambda(2\lambda)$, the above-mentioned optical diffraction method is not applicable. For that case, only SEM OR STM (AFM) analysis is applicable.

In the present invention, since the land width is wider than the groove width, the width of the recording mark on the land can be wider than the width of the recording mark on the groove, and as a result, the reading-out signal amplitude for CN ratio (carrier-to-noise ratio) at the land is greater than that of the groove and a difference may sometimes be caused to the signal quality between both of them.

In such a case, it is effective to select the layer constitution such that the reading-out signal amplitude or the CN ratio at the groove is made greater than that at the land.

As a guide for this purpose, it may be devised such that the change of the amount of reflected light of the reading-out light before and after the recording at the groove is made greater as compared with that at the land.

As a specific countermeasure, it is effective to take notice on the phase-difference of the reflected light before and after the recording and to define the phase-difference within such a range as advantageous for the recording on the groove.

The amplitude of the reading-out signal in the groove recording can be improved and the signal amplitude of an equal quality can be obtained both in land and groove recording by satisfying the following condition (1) or condition (2).

Condition (1):

If the reflectance in the recorded region ($R_2$) is lower than the reflectance in the unrecorded region ($R_1$) of the optical recording medium in the present invention, a phase difference a between the reflected light from the unrecording region and a reflected light from the recording region is represented by the following formula (4):

$$-\pi < \alpha < 0 \quad (4)$$

wherein α=(phase of reflected light from unrecording region)—(phase of reflected light from recording region)

Namely, the phase of the reflected light from the unrecording region has a delay within a range from 0 to π than the phase of the reflected light from the recording region.

Condition (2):

If the reflectance in the recording region is higher than the reflectance in the unrecording region of the optical recording medium in the present invention, a phase difference a between the reflected light from the unrecording region and a reflected light from the recording region is represented by the following formula (6):

$$0 < \alpha < \pi \quad (6)$$

wherein α=(phase of reflected light from unrecording region)—(phase of reflected light from recording region)

Namely, the phase of the reflected light from the unrecording region advances within a range from 0 to π than the phase of the reflected light from the recording region.

Further it is more preferred for increasing the amplitude of the reading-out signal of the recorded mark on the groove that the phase difference is within the following range:

for the case of the condition (1)

$$-(\tfrac{3}{4})\pi < \alpha < -(\tfrac{1}{4})\pi, \text{ or}$$

for the case of the condition (2)

$$(\tfrac{1}{4})\pi < \alpha < (\tfrac{3}{4})\pi$$

In order to design a disk capable of satisfying such conditions, it is necessary to accurately recognize the phase difference of the reflected light before and after the phase-change.

The phase-change of the reflected light before and after the phase-change can be measured actually, for example, by a laser interference microscope, and it can also be determined effectively by calculation using an optical constant and a thickness for each of layers of the disk.

The calculation method is detailed in "Base and Method for Spectroscopy" (written by Keiei Kudo, Published from Ohm Co., 1985, Chapter 3).

The optical constant for each of the layers can be obtained by previously manufacturing a single layer film, for example, by sputtering and then measuring using an ellipsometer or the like.

Effects of the reflectance change and the phase-difference before and after the recording on the application of the land recording or the groove recording is described specifically by using numerical formulae in Japanese Patent Application Laid-Open (KOKAI) 5-128589.

However Japanese Patent Application Laid-Open (KOKAI) 5-128589 describes nothing at all for employing both of the land and groove for the recording region.

Further the definition on the width between the land and the groove has no concerns at all for the improvement of the CN ratio in the groove of a narrower width relative to a wide land as employed in the present invention.

The L&G optical disk in the present invention is a rewritable optical information recording medium, but it is usable also as a write-once-type medium capable of rewriting only for once.

This is easily possible by recording an information writing inhibition signal to the disk from the drive such that second recording-erasure is impossible.

The disk may be used as a single side or in addition, two opposing disks may be append at the surfaces opposite to the substrates, to double the capacity.

This is an important feature which can not be attained by a magneto-optical type disk requiring a magnet on the side opposite to the side of laser irradiation.

Japanese Patent Application Laid-Open (KOKAI) 6-338064 discloses a definition regarding the groove depth and the groove width, but it is based on the premise that the groove width is substantially equal with the land with, and therefore, different from the present invention. Further, it provides no definition for the land width that is larger than the groove width.

Also, a sufficient signal intensity can be obtained by intensifying the signal in groove utilizing the phase difference described above, in a case of recording in the groove having a groove width of not more than 0.35(λ/NA) narrowing the groove width and land width.

Further the narrow groove is found advantageous in view of repetitive recording characteristic giving a significant problem in the phase-change optical disk.

It has not always been apparent the reason why the repetitive recording characteristic of utilizing the narrow groove is excellent, there may be a possibility that the material transfer or the deformation of the recording layer is constrained by the groove.

It is preferred that the groove width is narrow but the intensity of the tracking error signal is not sufficient if the groove width is too narrow. Further, a flat portion at the bottom of the groove is absent to bring about a disadvantage such as reduction of the signal intensity. Also, it is not preferably in L & G recording that the recording mark width overflows from the groove width.

Further the thickness of the groove gives an effect on the repetitive recording characteristic. If the groove is too shallow, the repetitive characteristic is worsened and the tracking error signal is also reduced. If the groove is too deep, a flat portion at the bottom of the groove is absent to bring about a disadvantage such as reduction of the signal intensity.

Accordingly, the groove width may be from 0.05(λ/NA) to 0.5(λ/NA), preferably, from 0.25(λ/NA) to 0.35(λ/NA), wherein λ is a recording laser wavelength and NA is a numerical aperture of an objective lens.

For example, in a case of using a lens at a wavelength of 780 nm and NA of 0.55, the groove width may be from 0.21 to 0.51 μm, preferably 0.35 to 0.50 μm. Furthermore, the lower limit of the groove width is about 0.1 μm from the viewpoint of the limitation of processing the groove formation.

The groove depth is, preferably, from 40 to 80 nm and, more preferably, from 45 to 70 nm from the viewpoint of the durability during repetitive overwriting.

Further the effect of the present invention becomes more conspicuous as the thickness of the dielectric protective layer disposed between the recording layer and the reflective layer is greater and the layer constitution has better recording sensitivity where a writing sensitivity is greatly improved because thermal diffusion is restricted by such a thick upper protective layer.

It is necessary for the phase-change optical disk to elevate the temperature to higher than the melting point of a usual recording film, and the working temperature is higher as compared with a magneto-optical disk or the like, so that which generally results in a problem of poor sensitivity.

Particularly, if the laser wavelength used is shorter for further increasing the density, the problem of the sensitivity is important since it becomes further difficult to obtain a high power laser diode.

However, since there is a problem in the phase-change optical disk that the repetitive recording characteristic is further worsened if a layer constitution of high sensitivity is used, a disk of poor sensitivity is used to be employed.

On the contrary, since the effect of the present invention is enhanced further by a disk of higher writing sensitivity with a thicker upper protective layer, it is possible to obtain a phase-change optical disk of high writing sensitivity and excellent repetitive recording characteristic.

Further, it is preferred that the land width (LW) and the groove width (GW) have the following relationship:

$$0.02 \leq (LW-GW)/PG \leq 0.3 \qquad (8)$$

wherein LW represents a land width (μm), GW represents a groove width (μm), and PG represents a groove pitch (μm) [=GW+LW].

If the difference between the land with and the groove width is too large, the signal in the groove is smaller than the signal in the land to result in loss of balance even if the layer constitution is adapted to emphasize the signal amplitude in the groove is adopted as described above, so that it is preferable to provide a limit as:

$$(LW-GW)/PG \leq 0.3$$

On the other hand, when the land width is more than the groove width a meaningful difference can be provided between the reflectance on the land and that in the groove before recording, particularly, by defining as:

$$(LW-GW)/PG \leq 0.02$$

and a tracking servo according to a 3-beam method operates stably.

Further a so-called track cross signal can be obtained easily separately from the servo system. Actually, if the land width is made nearly equal with the groove width, no track cross signal can be obtained at all, making it impossible for, the so-called track counting, counting the number of tracks in order to access to a particular track. Although other accessing methods may also be possible, use of the existent track counting method gives a great merit.

By making the groove width narrower than the land width within the above-mentioned range, the carrier level of the reading-out signal is made substantially equal between the land and the groove, and the difference of the amount of reflected light from the groove portion and the land portion can be made distinct in a case of applying the 3-beam system. Also, it is possible to obtain a favorable cross track signal.

Therefore, upon reading-out the information recording medium, the 3-beam system can be utilized in addition to the push-pull system, and divided push-pull system as the tracking system, and the cross track signal can be sued for counting the number of tracks passed upon radial movement.

When the tracking servo-characteristic it taken into consideration, the groove depth is preferably within a range from $\lambda/10n$ $\lambda/5n$, assuming the recording/reading-out light source wavelength as $\lambda$ and the substrate reflective index as n, and when the cross talk is taken into consideration, a range from $\lambda/6.5n$ to $\lambda/5.5n$ is particularly preferred.

The feature of the present invention will now be explained for overcoming cross erasure in which signals of adjacent track are erased along with repetitive recording. In the present invention, a minimum track pitch: (LW+GW)/2 is defined for overcoming the cross erasure.

Since the spot diameter of the optical beam spot is in proportion with $\lambda/NA$, the allowable minimum track pitch is regarded to be in proportion with $\lambda/NA$.

A proportional coefficient may be determined accurately based on experiment.

As a result of various actual studies made by the present inventors, if the groove pitch for the L & G recording is made greater than 1.2 ($\lambda/NA$), the lowering of the C/N ratio (carrier-to-noise ratio) after $10^4$ cycles of overwriting can be reduced to less than 3 dB, thereby attaining a level causing no practical problems.

As a result, it means that it is confirmed experimentally that since the substantial recording track pitch is one half of the groove pitch in the L&G recording, if the minimum recording track pitch is made greater than 0.6 ($\lambda/NA$), signal deterioration in adjacent tracks by cross erasure can prevented.

The value 0.6 described above just theoretically corresponds to one-half of the beam spot of a focused light beam (12) passing through an objective lens (11).

Figure 4:
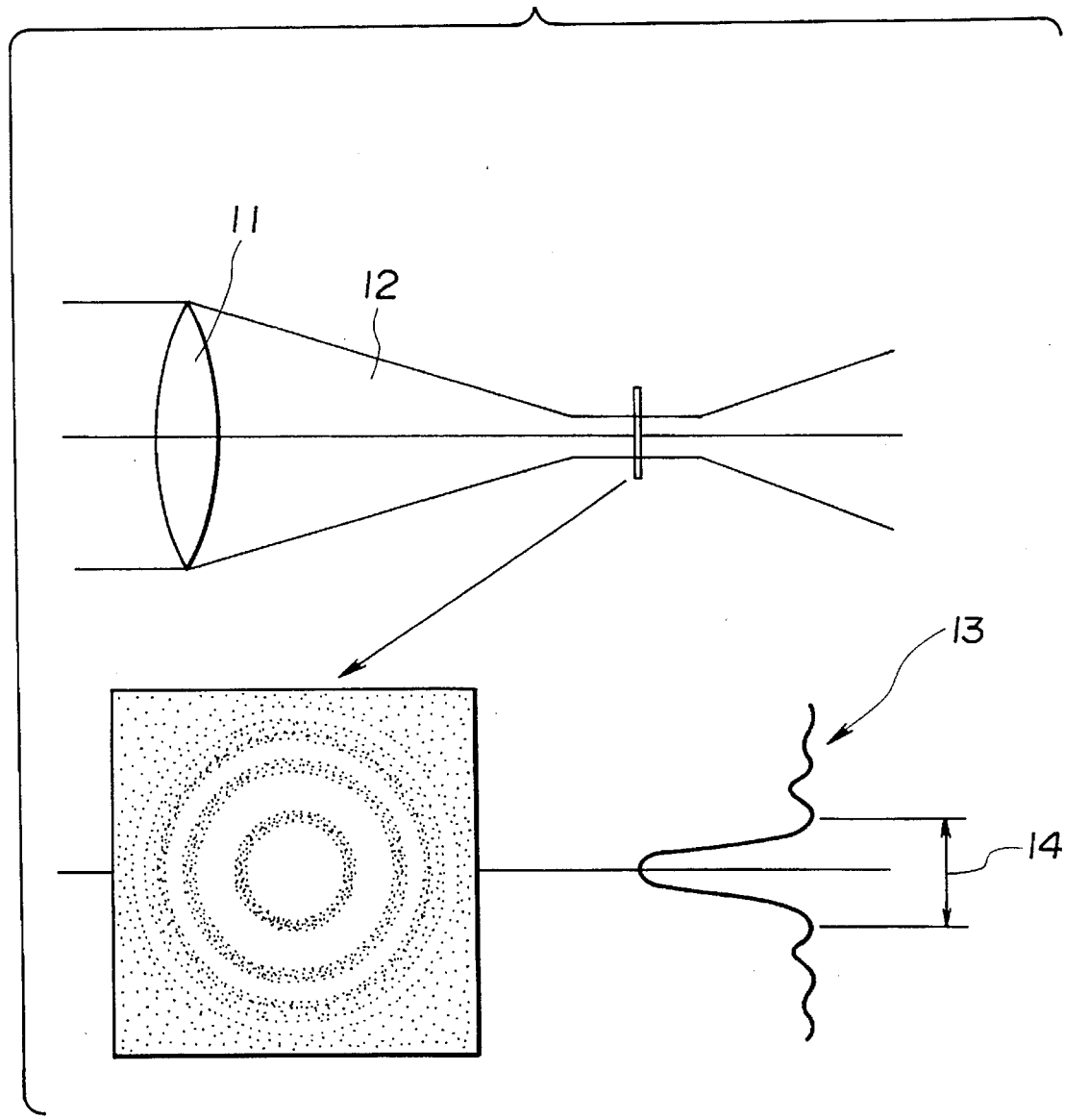
FIG. 4 is an explanatory view for the shape and the intensity of a focused beam view.

Namely, the focused light beam (12) has a shape as shown in FIG. 4 and a sub-peak appears in the intensity distribution by diffraction effect (a graph (13) showing intensity distribution in FIG. 4).

A diameter of a central spot is represented substantial by 1.2 ($\lambda/NA$). This is referred to as an airy disk (14).

Further the light intensity distribution is not uniform and diameter giving an intensity $1/e^2$ (e represents a base for natural logarithm) is represented as $0.82(\lambda/NA)$).

Since the minimum pitch of the track (1) corresponds to the radius of the airy disk, it becomes apparent for the physical meaning that the cross erasure phenomenon is caused, because the temperature of an adjacent track is elevated by a weak irradiation at a foot of the intensity distribution of a focused laser beam spot as a first approximation.

The close erasure phenomenon basically suffers from no substantial effect of heat conduction in the recording layer, because the heat conductivity is 2–3 order of magnitude smaller than that of a magneto-optical medium or the like, a recording layer, GeSbTe, AgInSbTe, InSnTe or InSbTe, containing by not less than 40 at % of one of elements belonging to the group IIIb, IVb, Vb, VIb, or a mixture (alloy) thereof as main components, such as GeSbTe, AgInSbTe, InSnTe or InSbTe.

Then, this is also because the recording layer is substantially adiabatic at 10 to 100 nano second order required for recording.

Accordingly, the minimum track pitch defined by 0.6($\lambda/NA$) described above is determined substantially by the beam spot diameter, and accordingly, only by the optical beam wavelength and the NA.

However, a further reduction, although little, of close erasure at not less than 10,000 cycles of repetitive overwriting can be attained also by the multi-layer constitution of the recording medium or by the restriction for the physical property of the recording layer.

Compositions for the alloy recording layer known at present in which reversible change is possible between crystal/amorphous states often has a melting point (Tm) of less than 700° C. and a crystallization temperature (Tg) of not less than 150° C., although depending on the melting point or the crystallization temperature of the recording layer.

Actually, the layer having a composition near $Ge_1Sb_2Te_4$ or $Ge_2Sb_2Te_5$ the melting point is from 600° to 620° C. and the crystallization temperature is from 150° to 170° C.

Further in $Ag_{0.11}In_{0.11}Te_{0.20}Sb_{0.55}$, the melting point is about at 550° C. and the crystallization temperature is about at 230° C.

If Tg is less than 150° C., stability of the amorphous state is poor tending to undergo cross erasure.

Further if Tm exceeds 700° C., energy to be irradiated upon recording is tending to increase, thereby tending to cause cross erasure to adjacent tracks.

Referring to the layer constitution, if the thickness of the recording layer exceeds 30 nm, since the recording sensitivity is lowered and further, heat tends to escape to the adjacent track, the cross erasure tends to occur.

Further since the definition for the minimum track pitch is determined by the recording track pitch and the radius of focused optical beam, this is valid not only for the case of the L&G recording but also for sample servo recording of providing pre-pit, and the land recording provided with grooves as usual.

However since it has been known in a case of the L&G recording that the groove depth is, preferably, set to about $\lambda/5n$ to about $\lambda/7n$ (n: refractive index of substrate) in order to reduce the cross talk, it is preferable to apply this in combination with the present invention.

Further the condition: $(LW+GW)/2 > 0.6(\lambda/NA)$ is applicable to the L&G recording at GW<LW as described above, it can be applied with no problem also to a case under the condition: GW≅LW. If it is used in a case under the condition: GW<LW, it is effective in that cross erasure can be overcome while improving the substantial track pitch compared with a case: GW≅LW.

Further, it has been known preferable, in a case of recording only in one of the groove or the land at a narrow pitch, that the groove depth is set to about $\lambda/8n$ in order to obtain a servo signal by a push-pull method.

Further, since it has also been known for the sample servo-recording that the depth of the servo-pit is preferably set to about $\lambda/4n$, this is preferably applied in combination with the present invention.

The multilayer constitution as shown in the FIG. 1 is formed on a transparent resin or glass substrate to light used for recording and reading-out.

Usually, a resin substrate such as a substrate composed of polycarbonate or polyolefin capable of easily formed an inexpensive and fine uneven structure by extrusion molding is often used.

As the polyolefin substrate, there can be mentioned, for example, Zeonex (produced by Nippon Zeon Co., Ltd.), Arton (produced by Japan Synthetic Rubber Co., Ltd.), Apel (produced by Mitsui Petrochemical Industries, Ltd.) or the like commercialized at present can be used. Since they have small photoelastic constant, vertical birefringence of less than $400 \times 10^{-6}$ and in-plane birefringence of less than $40 \times 10^{-6}$ can be attained easily.

On the other hand, since a polycarbonate resin, among all, a resin using bisphenol A having a number-average molecular weight of about 15,000 used generally for optical disks, has a large photoelastic constant, only a high vertical birefringence of about $400 \times 10^{-6}$ to $600 \times 10^{-6}$ can be obtained usual injection compression molding.

A vertical birefringence of less than $400 \times 10^{-6}$ can be obtained, example, by changing a pressure applied on a mold cavity in multi-steps upon molding a polycarbonate and greatly reducing a pressure during a cooling step.

Further, a substrate having a similarly lower vertical birefringence can also be obtained by annealing at a temperature lower by about 20° to 30° C. than the glass transition point.

In order to reduce the in-plane birefringence to less than $40 \times 10^{-6}$, it is most effective to increase or flowability of the resin for suppressing molecular orientation by shearing stresses during injection.

For this purpose, the molecular weight of the resin is set lower, or the resin melting temperature is set higher.

For instance, in a polycarbonate using bisphenol A, the weight-average molecular weight is controlled within a range from 4,000 to 20,000 and the resin temperature upon molding is set to about 350° C.

In a se-change medium, allowability for the in-plane birefringence is large and it is sufficient to be less than $40 \times 10^{-6}$.

However if it is not less than $40 \times 10^{-6}$, it undesirably causes aberration or increase of the laser beam of the light source.

On the other hand, an effect caused by astigmatism controlled by the vertical birefringence appears, for example, in groove recording as a difference between a focus position at which an error signal amplitude of a tracking servo system by a push-pull method (greater as the focused beam deviated from the groove center) reaches the maximum and a focus position at which the reading-out signal amplitude of marks recorded in the groove at a sufficient distance.

Namely in the FIG. 3, if a beam spot (10) is focused in an elongated shape in parallel with the longitudinal direction of the track (8 or 9), the reading-out signal reaches the maximum and the cross talk is minimized. Further, the track error signal is reduced.

On the other hand, in the FIG. 3, if the beam spot (10) is focused an elongated shape perpendicular to the longitudinal direction of the track (8 or 9), the reading-out signal of the bit described at a narrow distance and the track error signal substantially reach maximum but cross talk is increased.

The effect of the substrate birefringence and astigmatism are detailed in literatures: B. E. Bernaki, et al., Applied Optics, Vol. 32 (1993), page 6547, or S. Sugiyama, et al, Applied Optics, Vol. 33 (1994), page 5073.

As a difference between the two "optimal" focal positions is smaller, a medium of high compatibility with no effects of difference of drive mechanisms can be attained.

It has been known that the amount of the focus offset is substantially in proportion with the vertical refraction and it is about equal with the wavelength of the optical beam (M. R. Latta, et al., Proceeding of SPIE, Vol. 1663 (1992), page 157).

For setting the amount of the astigmatism to such a level as causing no practical problem, it may suffice that the vertical birefringence is not more than $400 \times 10^{-6}$ and it is substantially negligible below $300 \times 10^{-6}$.

In an optical disk, recording/read-out is usually performed by irradiating an optical beam through a transparent substrate of 1.0 to 2.0 mm in thickness. The problem of optical distortion described previously can be further moderated by defining the layer thickness to not less than 0.4 mm and not more than 1.0 mm.

As an effective method for overcoming the problem of the cross erasure, alone or in combination with the feature of the present invention, the track pitch in a region or recording the file management or allocation information is made wider by 1.05 to 1.5 times the track pitch in other data recording region in an optical information recording medium of reversibly recording, erasing or reading-out information by utilizing an optically distinguishable crystallized or amorphous state. As a more concrete means for obtaining the optical information recording medium, the file management or allocation region with the wide track pitch is disposed to the innermost circumference or the outermost circumference of the recording region on the disk.

Further at least one track of unrecorded region is disposed at the boundary between the region of a wide track pitch and the region of a narrow track pitch, to make a boundary at which the track pitch changes distinctive.

More preferably, cross erasure can surely be eliminated by defining the track pitch for the file management or allocation region as: $(LW+GW)/2>0.6(\lambda/NA)$ as described above.

On the contrary, it is not necessary to satisfy the foregoing conditions over the entire surface of the disk for eliminating the cross erasure, but the track pitch for the regions other than the file management or allocation region can be from 1/1.05 to 1/1.5.

Since the file management or allocation region in which repetitive overwriting is performed frequently is actually less than 1% in the entire recording capacity in most cases, if the track pitch for the remaining 99% region is made, for example, to 1/1.2, the capacity is increased by almost 20%.

The track pitch for the regions other than the file management or allocation region is preferably determined such that the cross talk is not more than 20 dB. The optical limit enables a track pitch to be always narrower than the limit determined by the cross erasure.

As is apparent, the track pitch can further be reduced, for example, making the wavelength of the laser beam shorter, raising the glass transition point of the recording layer to improve the heat resistance or increasing NA. In any way, an optical information recording medium with less deterioration to repetitive recording and having increased recording capacity can be obtained by increasing the track pitch for the file management or allocation region to 1.05 to 1.5 times the track pitch for the data region as in the present invention, compared with the case of using wider track pitches identical with each other.

The track pitch made different between the file management allocation region and the data region as in the present invention is always effective to any format in which the file management or allocation region is physically concentrated to a specific region.

At present, it is applicable to the FAT region in the DOS format and the TOC region in the CD format as described previously.

However, the present invention is not restricted to the memory media using such formats, but it is apparent that the invention is also effective to such a format as not actually used present so long as the file management or allocation region is physically concentrated.

The present invention is more effective as the ratio of the capacitance of the file management or allocation region is smaller relative to the entire capacitance of the medium but the ratio is not always restricted.

Further the present invention is effective not only to the L&G recording under the condition: 0.1 μm<(GW)<(LW) but also to usual L&G recording under the condition: (LW)=(GW). Further, it is effective to all phase-change media in which the track pitch is small and involves a problem of cross erasure.

Accordingly, it is effective also to a sample servo system with the track pitch, for example, of less than 1.0 μm.

Further, also in the existent system of recording to one of the groove or the land, if the track pitch is reduced to not less 0.8 μm along with the progress of fine fabrication technique in the feature, it is also an effective means for increasing the density.

The present invention is of course effective also to the 1-beam overwriting method not depending on the recording system such as a recording method by dividing a pulse for long mark recording.

As has been described above specifically by the optical recording medium and the recording/reading-out method according to the present invention, since the groove depth is defined cross talk from adjacent tracks can be reduced even if signals are recorded in both of the land and the groove.

Further, a disk which is particularly excellent in the repetitive overwriting characteristic on the land portion than the L&G recording at equal land width with groove width of the prior art can be provided, by defining the land width and the width within an appropriate range relative to the focused beam diameter determined by both of the wavelength of the laser beam and the numerical aperture of the objective lens.

Further the amplitude of the reading-out signal at the land is made greater than that at the groove by adopting the wide land, and a range for the phase-change of the reflective light before and after the phase-difference of the recording layer is defined such that the amplitude of the reading-out signal at the groove is more advantageous than that at the land as a countermeasure for the problem possibly causing an undesired difference for the signal quality between the land and the groove, and a countermeasure for the problem is proposed.

Furthermore, by using the optical recording medium according to the present invention, there can be provided a recording/reading-out method of using both the groove and the land as the recording region and capable of recording, erasing and reading-out at high density in any of the regions by 1-beam overwriting of the laser.

Also, phase-change optical disk capable of high sensitivity recording and having excellent repetitive characteristic can be obtained. That is, it is possible to simultaneously improve both the repetitive recording characteristics and the recording sensitivity mentioned so far as the drawbacks of the phase-change medium. Since the effects be obtained with no particular alteration of the recording film, the prior art film technique can be used as it is and invention is of a high industrial application worth. Further, since it is not necessary to oscillate a cutting laser beam upon forming the grooves, cutting is facilitated.

In the optical information recording medium according to the present invention, a phase-change-type recording layer is provided, and an optical information recording medium with less cross talk and suitable to high density recording can be obtained, irrespective of that the track pitch is less than 1 μm.

According to the optical information recording medium of the present invention, a phase-change-type recording medium with less deterioration to high density and a number of repeating recording can be obtained.

EXAMPLES

The present invention will be explained more specifically with reference to examples. Examples will be shown below but the invention is not restricted to the following experiments so long as it does not go out of the gist of the invention.

For disk substrates used in examples and comparative examples, plurality of disk substrates in which tracks of various sizes of groove width and land width were previously formed and having somewhat different groove shapes were prepared.

An layer constitution of films containing a recording layer was formed on each of the substrates as shown in the FIG. 1.

EXAMPLE 1

Polycarbonate (refractive index of 1.56 to a laser beam at a wavelength of 680 nm) was used as a material for the substrate.

A plurality of regions having different land width and groove width were used and repetitive overwriting characteristics were compared. The respective regions (region 1–3), the land width and the groove width are shown in Table 1. The groove depth was about 70 nm ($\lambda/6.2n$).

TABLE 1

| | Land width ($\mu$m) | Groove width ($\mu$m) | (LW - GW)/PG ($\mu$m) |
|---|---|---|---|
| Region 1 | 0.93 (0.75$\lambda$/NA) | 0.67 | 0.16 |
| Region 2 | 0.85 (0.69$\lambda$/NA) | 0.75 | 0.06 |
| Region 3 | 0.79 (0.622$\lambda$/NA) | 0.63 | 0.1 |

Each of a lower dielectric protective layer and an upper dielectric protective layer was made of a mixture comprising ZnS and $SiO_2$ (4:1 molar ratio), and the thickness of the lower dielectric protective layer was 100 nm and the thickness of the upper dielectric protective layer was 20 nm.

The recording layer was made by using a material comprising Ge, Sb and Te as the main ingredient causing reversible phase-change between an amorphous phase and a crystallized phase under laser irradiation, in which the compositional ratio for Ge:Sb:Te was about 22:25:53 (atomic ratio). The thickness of the recording layer was 25 nm.

The reflective layer was made of a material comprising Al and containing 2.5 at % of Ta and the thickness was 100 nm.

All the thin films were formed by sputtering in the order of lower dielectric protective layer/recording layer/upper dielectric protective layer/reflective layer. Finally, curable protective layer was formed thereon.

Since the recording layer is in an amorphous state just after forming the film by sputtering, it was applied with annealing entirely by a laser beam and phase-changed into a crystallized state, which was used as an initial (unrecorded) state.

Accordingly, upon recording, a focused beam of a high power laser is irradiated on the track to change the recording layer into the amorphous state, and a recording mark can be detected by the change of the amount of a reflected light from the amorphous recording mark formed as a result of irradiation.

Then, the disk was rotated at a linear velocity of 3 m/s and a semiconductor laser beam (circularly polarized light) at 68 nm was focused on the recording film through an objective lens having a numerical aperture of 0.55 and signal recording/reading-out was performed while performing tracking control by a push-pull system.

Signal recording was conducted as below.

The land or the groove was selected as the recording region, a long recording mark of 2.7 $\mu$m (mark length: intermark length=1:1) was repeatedly overwritten for predetermine number of cycles and, finally, a short recording mark of 0.67 $\mu$m was overwritten and the jitter of the recording mark was measured for evaluation.

Figure 5:
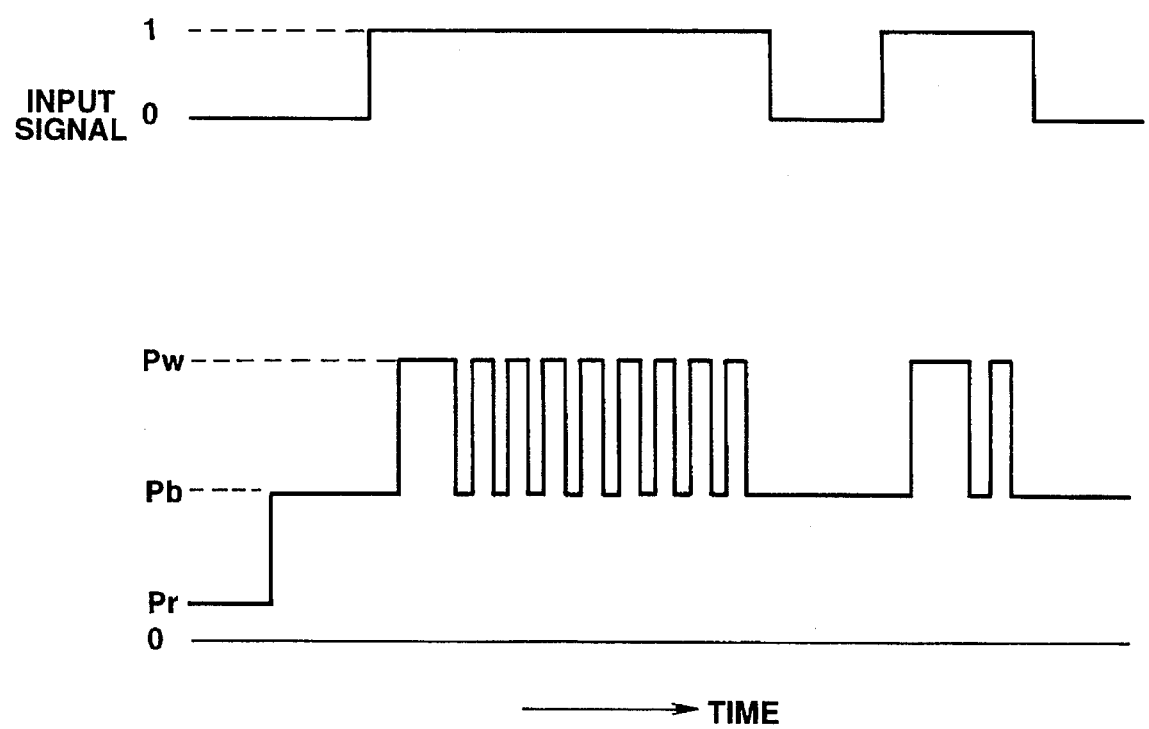
FIG. 5 is an explanatory view for a mark length recording by dividing a pulse recording marks in Example 1.
Figure 5:
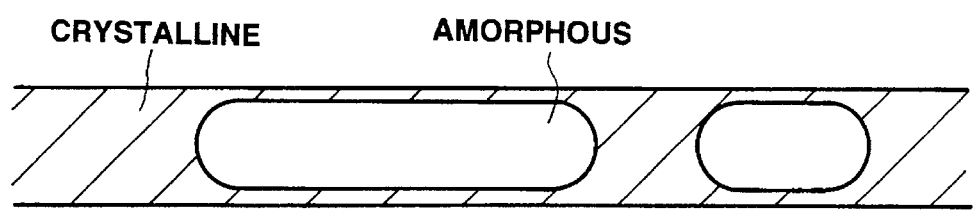

As an input pulse, a divided pulse as shown in FIG. 5 was used in a case of recording a long 2.7 $\mu$m mark so as to prevent the recording mark from deforming into a tear drop shape by thermal interference upon recording.

In a case of recording a short 0.67 $\mu$m mark, a pulse at 2.24 MHz and 25% duty ratio was inputted.

FIG. 2 shows a typical pulse pattern upon overwriting.

Upon recording, the laser power was increased to Pw to molten and quench the recording layer, thereby making the recording layer into the amorphous state.

Before and after the above-mentioned processing, the laser power was reduced to Pb, to elevate the temperature of the recording layer to higher than the crystallization temperature and lower than the melting point, to attain a crystallized state, that is, unrecorded state thereby erasing a preceding mark and attaining overwriting.

Reading-out can be attained by reducing the laser power to Pr to keep the recording layer at a low temperature as not cause the phase-change.

Recording was performed at laser power (Pw), Pb changed in a matrix-like manner for optimum overwriting and the power minimizing the jitter of the recording mark was defined as an optimum value.

Change in jitter (in nsec) of a short mark of 0.67 $\mu$m upon repetitive overwriting is shown in Table 2.

It can be seen that satisfactory repeating characteristic can be obtained also on the land as in the groove.

TABLE 2

| Overwriting cycle | GR1 | GR2 | GR3 | LR1 | LR2 | LR3 |
|---|---|---|---|---|---|---|
| 1 | 5 | 5 | 5 | 5 | 6 | 5 |
| 5 | 5 | 5 | 5 | 6 | 8 | 7 |
| 10 | 6 | 7 | 6 | 7 | 9 | 7 |
| 50 | 6 | 6 | 7 | 7 | 7 | 8 |
| 100 | 7 | 8 | 7 | 6 | 8 | 9 |
| 500 | 7 | 9 | 7 | 7 | 8 | 8 |
| 1,000 | 7 | 8 | 8 | 7 | 9 | 8 |
| 5,000 | 9 | 10 | 8 | 8 | 11 | 9 |
| 10,000 | 9 | 11 | 10 | 9 | 12 | 11 |

(Note)
GR1: Groove recording in the region 1
GR2: Groove recording in the region 2
GR3: Groove recording in the region 3
LR1: Land recording in the region 1
LR2: Land recording in the region 2
LR3: Land recording in the region 3

COMPARATIVE EXAMPLE 1

Different from Example 1, a plurality of regions having a land width out of the range of the present invention (regions 4–5) were used and the repetitive overwriting characteristics were compared.

Respective regions, the land width and the groove width are shown in Table 3.

TABLE 3

| | Land width ($\mu$m) | Groove width ($\mu$m) |
|---|---|---|
| Region 4 | 0.56 (0.45$\lambda$/NA) | 1.04 |
| Region 5 | 0.72 (0.58$\lambda$/NA) | 0.68 |

Figure 6:
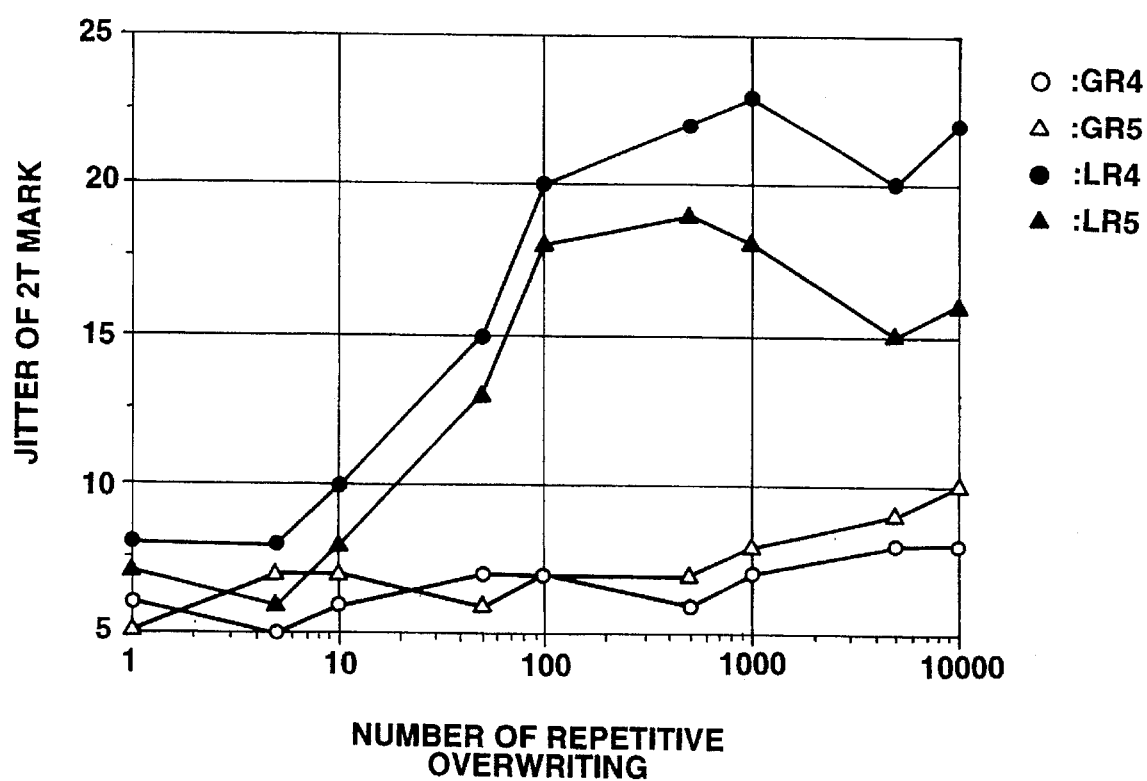
FIG. 6 is a view illustrating a relationship between the number of repetitive overwriting and jitter of a recording marks in Comparative Example 1.

Same evaluation as in Example 1 was conducted and the results are shown in FIG. 6 (Note: GR4 represents a groove recording in the region 4, GR5 represents a groove recording in the region 5, LR4 represents a land recording in the region 4, and LR5 represents a land recording in the region 5).

Different from Example 1, worsening of the repeating characteristics in the land region is remarkable.

EXAMPLE 2

Figure 7:
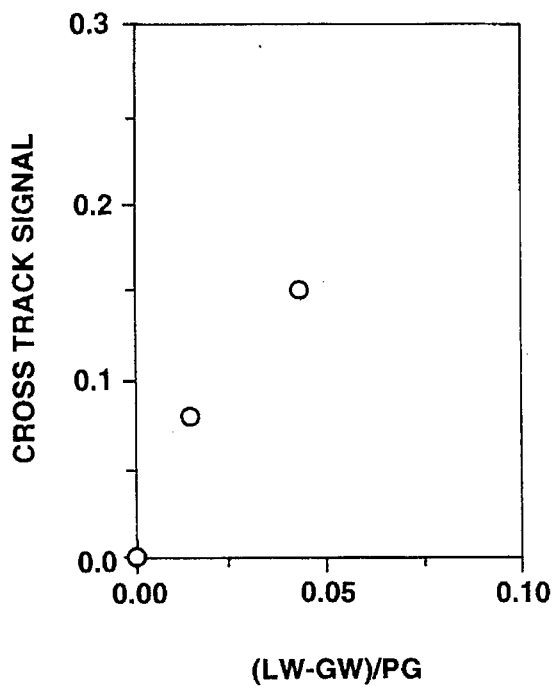
FIG. 7 shows a cross track signal of an optical disk according to the present invention in Example 2.
Figure 8:
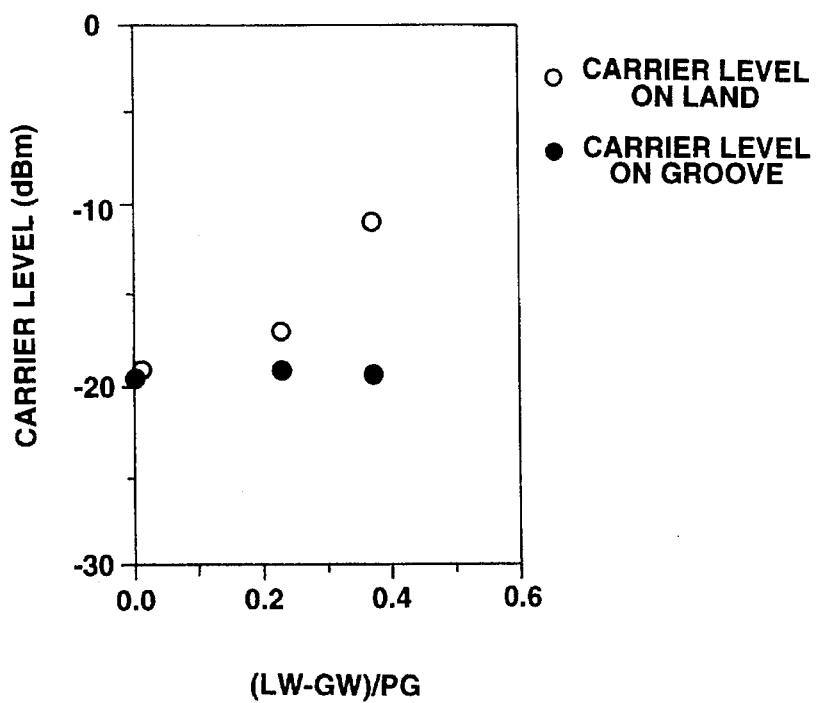
FIG. 8 shows a carrier level of an optical disk according to the present invention in Example 2.

Polycarbonate resin substrates having guide grooves with a groove pitch (GW+LW) of 1.4 $\mu$m and a groove depth of 70 nm (=$\lambda/6.2n$), in which the ratio between the land width and the groove width as shown in FIG. 7 and FIG. 8 were prepared. Reading-out was conducted to the disks in which a dielectric layer, a recording layer, a dielectric layer and a reflective layer were deposited successively on the substrate so as to provide 20% reflectance, by using a light pick-up at a wavelength of 780 nm LD and a numerical aperture of an objective lens of 0.55, and adjusting only the focus and a cross track signal (circularly polarized light) upon traversing the groove was measured.

As shown in FIG. 7, it will be understood that the following relation is necessary for ensuring a cross track signal of not less than 0.05 where this criteria is preferable or a practical drive system.

Cross track signal=|RL−RG|/RM wherein

RL: reflected light level upon irradiation of a condensed beam to the land,

RG: reflected light level upon irradiation of a condensed beam to the groove, and RM: reflected light level upon irradiation of a condensed beam to the mirror portion.

$$0.02 \leq (LW-GW)PG$$

wherein

LW: land width (µm)

GW: groove width (µm)

PG: groove pitch (µm)

Even if the land width and the groove width are not equal with each other, it is required that the levels for the respective signal amplitudes are equal to each other. It can be understood from FIG. 8 that the following relation is necessary in order that the ratio of the signal amplitude is not less 0.5 and not more than 2.0 between the land region and the groove region (difference of not more than 6 dB in the carrier level):

$$(LW-GW)/PG \leq 0.3$$

wherein

LW: land width (µm)

GW: groove width (µm)

PG: groove pitch (µm)

It can be seen that the following relation is preferable for making the ratio of the signal amplitude to not less than 0.7 and not more than 1.4 (difference of not more than 3 dB in the carrier level):

$$(LW-GW)/PG \leq 0.2$$

EXAMPLE 3

A plurality of substrates in which groove pitch was changed from 1.3 µm to 1.6 µm at 0.05 µm step were provided. The groove depth I was about 70 nm.

Accordingly, a substantial recording track pitch is one-half of the groove pitch, namely, 0.65 to 0.8 µm.

On the surface of the substrate, were formed $(ZnS)_{80}(SiO_2)_{20}$ to 100 nm as a lower protective layer $Ge_{22}Sb_{23.5}Te_{54.5}$ to 20 nm as a recording layer, $(ZnS)_{80}(SiO_2)_{20}$ to 20 nm as an upper protective layer and $Al_{97.5}Te_{2.5}$ to 100 nm as a reflection layer by sputtering. A UV-curable resin was further provided as a protective film on the reflective layer.

Evaluation was made by using an optical head at a wavelength of 680 nm and NA=0.55.

In the case of recording in the groove, repetitive overwriting was conducted for both lands adjacent thereto, and the lowering of C/N ratio of the signals recorded initially in the groove was measured.

The same measurement was also conducted to a case of performing recording to the land and then repetitive overwriting was conducted in both adjacent grooves.

If the groove pitch was greater than 1.5 µm (recording track pitch of 0.75 µm), reduction for the C/N ratio in the adjacent groove or land after overwriting for 10,000 cycles of times could be kept to not more than 3 dB, which was a level causing no practical problem.

Since the criteria of the minimum track pitch in the present invention is 0.6λ/NA=(680/0.55)×0.6=741 nm=0.741 µm, the recording track pitch of 0.75 µm can be regarded not less than the factor 0.6 µ/NA.

On the other hand, when a similar experiment was conducted using a head at 680 nm and NA=0.6, there was no problem up to the groove pitch of 1.4 µm (recording track pitch: 0.7 µm).

This can satisfy the minimum recording track pitch condition of (680/0.6)×0.6=0.680 µm.

Although so-called L&G recording was referred to, it is effective to all phase-change media of small track pitch, causing a problem of cross talk or cross erasure. Accordingly, it is of course effective also to a sample servo system, for example, at a track pitch of not more than 1.0 µm, or current system of recording to one of the groove on the land.

As a result of analysis dissolved by numerical calculation for thermal diffusion equations conducted by the present inventors, the layer constitution used in this example is one of the layer constitutions showing greatest thermal diffusion in the lateral direction and study was made under most severe conditions regarding the cross erasure. Accordingly, it can be considered that the definition regarding the minimum track pitch described above can be established not depending on the layer constitution.

EXAMPLE 4

A polyolefin substrate (Zeonex (trade name), produced by Nippon Zeon Co.) was used as a substrate. For serving to the L&G recording, the substrate used has the groove width and the inter-groove width (land width) substantially equal with each other, and a groove pitch of 1,4 µm, namely, a recording track pitch of 0.7 µm as one-half thereof. The groove depth was about 70 nm.

The substrate had a vertical birefringence of $200 \times 10^{-6}$ and an in-plane birefringence of $10 \times 10^{-6}$.

On the surface of the substrate, the recording medium with the same layer constitution as in Example 3 was formed. The physical properties of the resultant optical recording medium were measured.

An optical head having a wavelength at 680 nm and NA of 0.55 (linearly polarized light) was used. The linear velocity was 3 m/s, Pw=8–9 mW, Pb=4.5 mW. The recording power was modulated by a single pattern at a frequency of 2.24 MHz and 25% duty.

At first, recording was carried out to one land, and a carrier level $C_L$ was read. Further, recording was carried out on both unrecorded grooves adjacent to another unrecorded land, and a carrier level $C_G$ for the leak signal in the land was measured to calculate a difference of the carrier level ($C_G - C_L$), to thereby measure cross talk.

Using an optical system at a wavelength of 680 nm and NA of 0.55 and varying the offset amount of a focus servo system, a position at which the amplitude of a track error signal (so-called TES) reached maximum and a position at which a cross talk was optimized were measured.

Since the cross talk was defined as a negative value, a smaller value and, accordingly, a large absolute value means better cross talk.

As the difference of the focus position between the maximum TES and the minimum cross talk is smaller, it means that the astigmatism effect is smaller and signals approximate to optimum values can be obtained both for the servo system and the reading-out signal systems.

In the medium of Example 4, focus positions at which TES reaches maximum and cross talk reaches minimum are substantially aligned with each other at a position, and 27 dB of cross talk can be obtained in the vicinity of the position.

COMPARATIVE EXAMPLE 2

An optical recording medium was obtained in the same manner as in Example 4 except for using a substrate composed of a polycarbonate having a vertical birefringence of $550 \times 10^{-6}$ and in-plane birefringence of $5 \times 10^{-6}$.

Physical properties were measured in the same manner as in Example 4.

In the medium of Comparative Example 2, a difference of about 0.5 μm was caused between a focus position for maximizing TES and that for minimizing cross talk. At the minimum cross talk position, the cross talk was −28 dB, but the cross talk was decreased to −22 dB when adjusted at the maximum TES position for servo track and only a value smaller than 25 dB required usually was obtained.

EXAMPLE 5

The groove width was 0.37 μm and the groove pitch was 1.6 μm as a result of determination by using a diffracted light intensity of a HeNe laser, and the land width was 1.23 μm. The material of the substrate was polycarbonate.

On the substrate, were formed a layer comprising $(ZnS)_{80}(SiO_2)_{20}$ at 120 nm, a layer comprising $Ge_{12}Sb_{36}Te_{52}$ (at %) at 30 nm, a layer comprising $(ZnS)_{80}(SiO_2)_{20}$ at 205 nm, and a layer comprising an Al alloy at 200 nm, in this order by a magnetron sputtering method and, further, an UV-ray curable resin layer was disposed to 4 μm in thickness, to manufacture a disk. This thicker upper protective layer in comparison with the medium in Example 3 assured higher writing sensitivity than that of the medium in Example 3.

The disk was measured for the repetitive recording characteristics as below by using an optical disk evaluation device (laser wavelength at 780 nm, NA 0.55) as shown below.

The disk was rotated at 1.4 m/s, the recording power and bias power were set to 6 mW and 3 mW, respectively, and an EFM random signal was overwritten by a divided pulse recording system as shown in FIG. 5.

In the instance, a relationship was examined between the number of times of overwriting and 3T mark length jitter.

As a result, the number of recording times at which jitter was kept to not more than 40 nsec was 3,000. The groove width of the disk substrate corresponds to $0.26 \times (\lambda/NA)$. Under these recording condition, when the jitter is not more 40 nsec at 1,000 of the recording times, such medium has no problem in practical use.

EXAMPLE 6

The substrate used had U-shaped grooves (approximate rectangle shape), and the groove width was 0.37 μm and the groove pitch was 1.6 μm as a result of determining by using a diffracted light intensity of HeNe laser.

The material of the substrate was polycarbonate.

On the substrate, were formed a layer comprising $(ZnS)_{80}(SiO_2)_{20}$ at 120 nm, a layer comprising $Ge_{12}Sb_{36}Te_{52}$ (at %) at 30 nm, a layer comprising $(ZnS)_{80}(SiO_2)_{20}$ at 20 nm, and a layer comprising an Al alloy at 200 nm, in this order by a magnetron sputtering method and, further, an UV-ray curable resin layer was disposed to 4 μm in thickness, to manufacture a disk.

When the evaluation was made under the same conditions as those in Example 5, except for setting the recording power and the bias power to 12 mW and 6 mW, respectively, the number of recording times at which the jitter was kept to not than 40 nsec was 5,000. The groove width of the disk substrate corresponds to $0.26 \times (k/NA)$.

In Examples 5 to 6, when repetitive overwriting was performed in the same manner on the land, satisfactory characteristic comparable with that for the groove could be obtained.

For making the signal amplitude substantially equal between the groove and the land, better result was obtained by making the land width to not more than 1.1 μm and, further, satisfactory repetitive over-writing characteristic could be obtained on the land by making the width to not less than 0.9 μm.

COMPARATIVE EXAMPLE 3

The groove width was 0.71 μm and the groove pitch was 1.6 μm as a result of determination by using a diffracted light intensity of HeNe laser. The material of the substrate was polycarbonate.

On the substrate, were formed a layer comprising $(ZnS)_{80}(SiO_2)_{20}$ at 120 nm, a layer comprising $Ge_{12}Sb_{36}Te_{52}$ (at %) at 30 nm, a layer comprising $(ZnS)_{80}(SiO_2)_{20}$ at 205 nm, and a layer comprising an Al alloy at 200 nm, in this order by a magnetron sputtering method and, further, an UV-ray curable resin layer is disposed to 4 μm in thickness, to manufacture a disk.

When disk was evaluated in the same manner as in Example 5, the number of recording times at which the jitter was kept not more than 40 nsec was 20 times.

The groove width of the disk substrate corresponds to $0.50 \times (k/NA)$.

COMPARATIVE EXAMPLE 4

The substrate used had U-shaped grooves, and the groove width was 0.39 μm the groove depth was 30 nm and the groove pitch was 1.6 μm as a result of determination by using a diffracted light intensity of a HeNe laser. The material of the substrate was polycarbonate.

On the substrate, were formed a layer comprising $(ZnS)_{80}(SiO_2)_{20}$ at 120 nm, a layer comprising $Ge_{12}Sb_{36}Te_{52}$ (at %) at 30 nm, a layer comprising $(ZnS)_{80}(SiO_2)_{20}$ at 20 nm, and a layer comprising an Al alloy at 200 nm, in this order by a magnetron sputtering method and, further, an UV-ray curable resin layer was disposed to 4 μm in thickness, to manufacture a disk.

When evaluation was made under the same conditions as those in Example 5, except for setting the recording power and the bias power to 12 mW and 6 mW, respectively, the number of recording times at which the jitter was kept to not more than 40 nsec was 200 times.

The groove width of the disk substrate corresponds to 0.28×(k/NA), but since the depth was as shallow as 30 nm, no excellent characteristic was obtained.

EXAMPLE 7

A polycarbonate resin substrate having spiral grooves was formed by injection molding.

On the substrate, were formed a layer comprising $(ZnS)_{80}(SiO_2)_{20}$ at 100 nm, a layer comprising $Ge_{22}Sb_{25}Te_{52}$ (at %) at 25 nm, a layer comprising $(ZnS)_{80}(SiO_2)_{20}$ at 20 nm, and $Al_{97.5}Te_{2.5}$ to 100 nm as a reflection layer, in this order by a magnetron sputtering method and, further, an UV-ray curable resin layer was disposed to 4 μm in thickness, to manufacture a disk.

As the groove pitch (groove to groove distance), a portion of 1.6 μm and a portion of 1.4 μm were formed.

The effective recording track pitch of (LW+GW)/2 in each of the cases were about 0.8 μm and 0.7 μm, respectively in L & G recording.

The groove depth was about 70 nm in each of the cases.

An optical head at a wavelength of 680 nm and NA of 0.55 was used. Namely, 0.6×k/NA=0.741 μm is the minimum recording track pitch given in the present invention.

Linear velocity=3 m/s, Pw=8–9 mW, Pe=−4.5 mW.

The recording power was modulated by a single pattern at a frequency of 2.24 MHz and 25% duty.

Even if the track pitch was different, there was no trouble in the tracking so long as it is within such a range.

Figure 9:
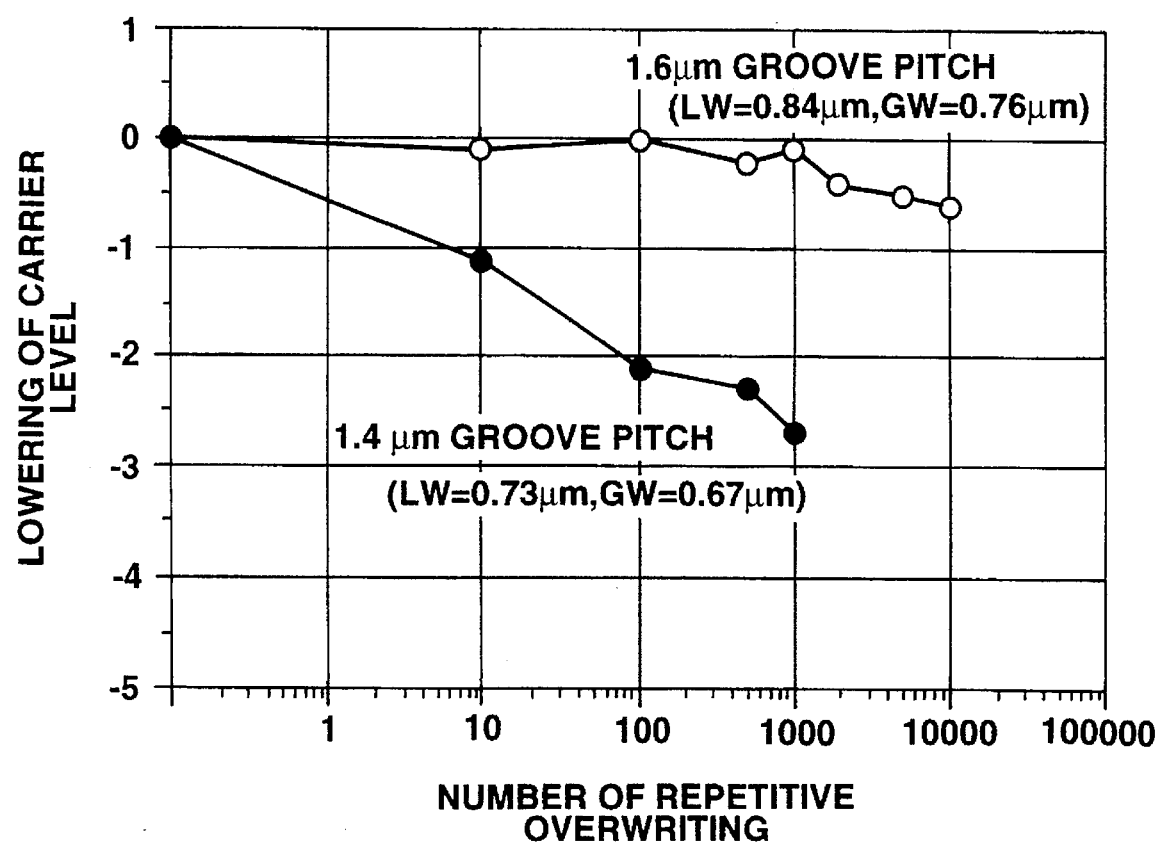
FIG. 9 is a graph showing the change of a carrier level for signals in Example 7.

FIG. 9 shows reduction of the carrier level of a signal recorded in a land upon repetitive overwriting in both adjacent grooves.

In a portion of the groove pitch of 1.4 μm (land width= 0.73 μm, groove width=0.67 μm), the carrier level was reduced by about 3 dB along with repetitive overwriting for 1,000 times but this level causes no trouble when it is used as a usual data recording region.

On the other hand, since deterioration was scarcely observed for the portion of groove pitch of 1.6 μm (land width=0.84 μm, groove width=0.76 μm) even after 10,000 cycles of overwriting, it can be seen that the portion can be used as a file management or allocation information region.

The above brings about too in case of performing the recording on a groove and the repetitive overwriting on the adjacent lands.

Even if the groove pitch of the file management or allocation region is 1.6 μm, since the ratio thereof is not more than 1% per a whole of the disk, the substantial recording capacity is determined by residual 1.4 μm pitch.

It is of course possible to further restrict the track pitch by making the laser beam wavelength shorter, increasing the glass transition point of the recording layer to improve the heat resistance or increasing NA. An optical information recording medium with less deterioration to repetitive recording entirely, is obtained by making the track pitch for the file management or allocation region from 1.05 to 1.5 times of the track pitch for the data region as in the present invention is made as compared with the case entirely using the track pitch of the same width.

EXAMPLE 8

An optical recording medium was obtained in the same procedure as in Example 7, except for using $(ZnS)_{80}(Y_2O_3)_{20}$ as a material for the protective layer. The same effect as in Example 7 was obtained.

What is claimed is:

1. An optical recording medium for recording, erasing and reading-out information by irradiation of a laser beam, comprising:

a lower dielectric protective layer, a phase-change-type recording layer, an upper dielectric protective layer and a metal reflective layer successively deposited on a transparent substrate formed with grooves, in which both of grooves and lands are used as a recorded region, a groove depth (d) satisfies the following relation (1):

$$\lambda/7n < d < \lambda/5n \qquad (1)$$

wherein λ represents a wavelength of an irradiation light and n represents a refractive index of the substrate, and a groove width (GW) and a land width (LW) satisfy the following relation (2):

$$0.1 \ \mu m < GW < LW \qquad (2).$$

2. An optical recording medium as defined in claim 1, wherein the land width (LW) satisfies the following relation (3):

$$0.62(\lambda/NA) < LW < 0.80(\lambda/NA) \qquad (3)$$

wherein NA represents a numerical aperture of a lens.

3. An optical recording medium as defined in claim 2, wherein a phase difference (α) between a reflected light from an unrecorded region and a reflected light from a recorded region of an optical recording medium satisfies the following relation (4):

$$-\pi < \alpha < 0 \qquad (4)$$

and a reflectance ($R_1$) of an unrecorded region and a reflectance ($R_2$) of a recorded region satisfy the following relation (5):

$$R_2 < R_1 \qquad (5).$$

4. An optical recording medium as defined in claim 2, wherein a phase difference (α) between a reflected light from an unrecorded region and a reflected light from a recorded region of an optical recording medium satisfies the following relation (6):

$$0 < \alpha < \pi \qquad (6)$$

and a reflectance ($R_1$) of an unrecorded region and a reflectance ($R_2$) of a recorded region satisfy the following relation (7):

$$R_2 > R_1 \qquad (7).$$

5. An optical recording medium as defined in claim 2, wherein a land width (LW), a groove width (GW) and a distance between adjacent grooves (groove pitch (PG)=LW+ GW) satisfy the following relation (8):

$$0.02 \leq (LW-GW)/PG \leq 0.3 \qquad (8).$$

6. An optical recording medium as defined in claim 2, wherein the groove depth is from 40 to 80 nm and the groove width (GW) satisfies the following relation (9):

$$0.15(\lambda/NA) < GW < 0.5(\lambda/NA) \qquad (9).$$

7. An optical recording medium as defined in claim 1, wherein the phase difference ($\alpha$) between a reflected light from an unrecorded region and a reflected light from a recorded region of the optical recording medium satisfies the following relation (4):

$$-\pi < \alpha < 0 \qquad (4)$$

and a reflectance ($R_1$) of the unrecorded region and reflectance ($R_2$) of the recorded region satisfy the following relation (5):

$$R_2 < R_1 \qquad (5).$$

8. An optical recording medium as defined in claim 1, wherein the phase difference ($\alpha$) between a reflected light from an unrecorded region and a reflected light from a recorded region of the optical recording medium satisfies the following relation (6):

$$0 < \alpha < \pi \qquad (6)$$

and a reflectance ($R_1$) of an unrecorded region and a reflectance ($R_2$) of a recorded region satisfy the following relation (7):

$$R_2 > R_1 \qquad (7).$$

9. An optical recording medium as defined in claim 1, wherein the land width (LW), the groove width (GW) and a groove pitch (PG) satisfy the following relation (8):

$$0.02 \leq (LW-GW)/PG \leq 0.3 \qquad (8).$$

10. An optical recording medium as defined in claim 1, wherein the melting point of the recording layer is less than 700° C. and the crystallizing temperature of the recording layer is not less than 150° C.

11. An optical recording medium as defined in claim 10, wherein the recording layer comprises an alloy mainly composed of Ge, Sb and Te as a main ingredient and has a thickness from 15 to 25 nm.

12. An optical recording medium as defined in claim 10, wherein the reflective layer comprises an alloy of Al and Ti or Ta, and the Ti or Ta content is from 0.5 to 3.5 at %.

13. An optical recording medium as defined in claim 10, wherein at least one layer of the lower dielectric protective layer and the upper dielectric protective layer comprises ZnS and $SiO_2$ or $Y_2O_3$, and the $SiO_2$ or $Y_2O_3$ content is from 5 to 40 mol %.

14. An optical recording medium as defined in claim 1, wherein the groove depth is from 40 to 80 nm and the groove width (GW) satisfies the following relation (9):

$$0.15(\lambda/NA) < GW < 0.5(\lambda/NA) \qquad (9).$$

15. An optical recording medium as defined in claim 1, wherein a track pitch of a region to which a file management or allocation information is recorded is greater by 1.05 to 1.5 times a track pitch of data recorded regions.

16. An optical recording medium as defined in claim 15, wherein the groove width (GW) and the land width (LW) in the file management or allocation region satisfy the following relation (10):

$$0.6(\lambda/NA) < (GW+LW)/2 < 1.0 \;\mu m \qquad (10).$$

17. An optical recording medium as defined in claim 15, wherein the melting point of the recording layer is less than 700° C. and the crystallizing temperature of the recording layer is not less than 150° C.

18. An optical recording medium as defined in claim 15, wherein the recording layer comprises an alloy mainly composed of Ge, Sb and Te as a main ingredient and has a thickness from 15 to 25 nm.

19. An optical recording medium as defined in claim 15, wherein the reflective layer comprises an alloy of Al and Ti or Ta, and the Ti or Ta content is from 0.5 to 3.5 at %.

20. An optical recording medium as defined in claim 15, wherein at least one layer of the lower dielectric protective layer and the upper dielectric protective layer comprises ZnS and $SiO_2$ or $Y_2O_3$, and the $SiO_2$ or $Y_2O_3$ content is from 5 to 40 mol %.

21. A optical recording medium as defined in claim 15, wherein a vertical birefringence of the substrate is less than $400 \times 10^{-6}$ and an in-plane birefringence of said substrate is less than $40 \times 10^{-6}$.

22. An optical recording medium as defined in claim 15, wherein a thickness of the substrate is not less than 0.4 mm and less than 1.0 mm.

23. An optical recording medium as defined in claim 1, wherein the groove width (GW) and the land width (LW) satisfy the following relation (10):

$$0.6(\lambda/NA) < (GW+LW)/2 < 1.0 \;\mu m \qquad (10).$$

24. An optical recording medium as defined in claim 23, wherein the melting point of the recording layer is less than 700° C. and the crystallizing temperature of the recording layer is not less than 150° C.

25. An optical recording medium as defined in claim 24, wherein the recording layer comprises an alloy mainly composed of Ge, Sb and Te as a main ingredient and has a thickness from 15 to 25 nm.

26. An optical recording medium as defined in claim 24, wherein the reflective layer comprises an alloy of Al and Ti or Ta, and the Ti or Ta content is from 0.5 to 3.5 at %.

27. An optical recording medium as defined in claim 24, wherein at least one layer of the lower dielectric protective layer and the upper dielectric protective layer comprises ZnS and $SiO_2$ or $Y_2O_3$, and the $SiO_2$ or $Y_2O_3$ content is from 5 to 40 mol %.

28. A optical recording medium as defined in claim 23, wherein a vertical birefringence of the substrate is less than $400 \times 10^{-6}$ and an in-plane birefringence of said substrate is less than $40 \times 10^{-6}$.

29. An optical recording medium as defined in claim 23, wherein a thickness of the substrate is not less than 0.4 mm and less than 1.0 mm.

30. An optical recording medium comprising a lower dielectric protective layer, a phase-change-type recording layer, an upper dielectric protective layer and a metal reflective layer deposited successively on a transparent substrate formed with grooves for reversibly recording, erasing and reading-out information by utilizing an optically distinguishable crystallized or amorphous state, in which a track pitch of a region to which a file management or allocation information is recorded is greater by 1.05 to 1.5 times a track pitch of data recorded regions.

31. An optical recording medium as defined in claim 30, wherein a groove width (GW) and a land width (LW) in the file management or allocation region satisfy the following relation (10):

$$0.6(\lambda/NA) < (GW+LW)/2 < 1.0 \ \mu m \qquad (10).$$

32. An optical recording medium as defined in claim 31, wherein a vertical birefringence of the substrate is less than $400\times10^{-6}$ and an in-plane birefringence of said substrate is less than $40\times10^{-6}$.

33. An optical recording medium as defined in claim 31, wherein a thickness of the substrate is not less than 0.4 mm and less than 1.0 mm.

34. An optical recording medium as defined in claim 31, wherein the melting point of the recording layer is less than 700° C. an the crystallizing temperature of said layer is not less than 150° C.

35. An optical recording medium as defined in claim 34, wherein the recording layer comprises an alloy mainly composed of Ge, Sb and Te as a main ingredient and has a thickness from 15 to 25 nm.

36. An optical recording medium as defined in claim 34, wherein the reflective layer comprises an alloy of Al and Ti or Ta, and the Ti or Ta content is from 0.5 to 3.5 at %.

37. An optical recording medium as defined in claim 34, wherein at least one layer of the lower dielectric protective layer and the upper dielectric protective layer comprises ZnS and $SiO_2$ or $Y_2O_3$, and the $SiO_2$ or $Y_2O_3$ content is from 5 to 40 mol %.

* * * * *